(12) United States Patent
Barker

(10) Patent No.: US 10,447,783 B2
(45) Date of Patent: Oct. 15, 2019

(54) COMMUNICATION METHOD

(71) Applicant: Nomad Spectrum Limited, Newcastle Upon Tyne (GB)

(72) Inventor: Nick Barker, Durham (GB)

(73) Assignee: Nomad Digital Limited, London (GB)

(*) Notice: Subject to any disclaimer, the term of this patent is extended or adjusted under 35 U.S.C. 154(b) by 1480 days.

(21) Appl. No.: 14/092,029

(22) Filed: Nov. 27, 2013

(65) Prior Publication Data
US 2014/0149547 A1 May 29, 2014

(30) Foreign Application Priority Data

Nov. 28, 2012 (GB) .................................. 1221423.5

(51) Int. Cl.
*H04L 29/08* (2006.01)
*H04W 48/20* (2009.01)
*H04W 84/00* (2009.01)
*H04W 88/00* (2009.01)

(52) U.S. Cl.
CPC ............. *H04L 67/12* (2013.01); *H04W 48/20* (2013.01); *H04W 84/005* (2013.01); *H04W 88/005* (2013.01)

(58) Field of Classification Search
None
See application file for complete search history.

(56) References Cited

U.S. PATENT DOCUMENTS

| 6,085,238 A * | 7/2000 | Yuasa | H04L 12/4641 370/409 |
| 6,988,079 B1 * | 1/2006 | Or-Bach | G06Q 10/08 340/10.1 |
| 7,209,435 B1 * | 4/2007 | Kuo | H04L 45/00 370/219 |
| 7,486,610 B1 | 2/2009 | Bhupalam et al. | |
| 7,581,024 B1 | 8/2009 | Yip et al. | |
| 7,801,030 B1 | 9/2010 | Aggarwal et al. | |

(Continued)

FOREIGN PATENT DOCUMENTS

| EP | 1598255 A1 | 11/2005 |
| WO | 2007063168 A1 | 6/2007 |
| WO | 2012110771 A2 | 8/2012 |

OTHER PUBLICATIONS

Search Report Received for GB Patent Application No. GB1221423.5, date of search Jun. 13, 2013, 5 pages.

(Continued)

*Primary Examiner* — Backhean Tiv
(74) *Attorney, Agent, or Firm* — Fiala & Weaver P.L.L.C.

(57) ABSTRACT

A method of transmitting data from a first device. The method comprises: at the first device, establishing a connection with a first one of a plurality of second devices and establishing a first virtual connection, the first virtual connection being between the first device and a third device through the first one of a plurality of second devices; and receiving details of a second virtual connection, the second virtual connection being between a fourth device and the third device through a second one of the plurality of second devices, the fourth device being connected to the first device. The method further comprises selecting one of said first or second virtual connections for transmission of a data packet to said third device and transmitting data to said third device using said selected connection.

15 Claims, 13 Drawing Sheets

(56) References Cited

U.S. PATENT DOCUMENTS

| | | | | |
|---|---|---|---|---|
| 8,185,264 | B2* | 5/2012 | Carroll | B61L 15/0027 246/167 D |
| 8,514,825 | B1* | 8/2013 | Addepalli | H04W 4/046 370/338 |
| 9,036,509 | B1* | 5/2015 | Addepalli | H04W 4/046 370/259 |
| 9,497,794 | B2* | 11/2016 | Carroll | H04W 36/02 |
| 9,578,501 | B2* | 2/2017 | Barker | H04L 63/08 |
| 9,883,429 | B2* | 1/2018 | Timms | H04W 36/0083 |
| 9,949,309 | B2* | 4/2018 | Carroll | H04L 45/54 |
| 9,961,548 | B2* | 5/2018 | Bryksa | H04L 63/105 |
| 10,182,386 | B2* | 1/2019 | Barker | H04W 40/026 |
| 2004/0076177 | A1* | 4/2004 | Koch | H04W 52/0235 370/465 |
| 2004/0147223 | A1* | 7/2004 | Cho | H04L 12/66 455/41.2 |
| 2005/0066216 | A1 | 3/2005 | Hebbar et al. | |
| 2005/0160169 | A1* | 7/2005 | Segal | H04W 36/0011 709/225 |
| 2005/0174974 | A1* | 8/2005 | Sonntag | H04W 92/20 370/338 |
| 2005/0249145 | A1* | 11/2005 | Wilson | H04B 7/18582 370/316 |
| 2007/0287133 | A1* | 12/2007 | Schubert | F41A 33/00 434/11 |
| 2008/0112473 | A1* | 5/2008 | Refaeli | H04B 3/542 375/222 |
| 2008/0198859 | A1 | 8/2008 | Elias et al. | |
| 2009/0022136 | A1* | 1/2009 | Joshi | H04B 7/2123 370/348 |
| 2009/0067436 | A1* | 3/2009 | Gast | H04L 12/4679 370/395.53 |
| 2009/0262741 | A1* | 10/2009 | Jungck | H04L 29/12066 370/392 |
| 2009/0296565 | A1 | 12/2009 | Kuo et al. | |
| 2010/0046469 | A1* | 2/2010 | Kang | H04W 36/0011 370/331 |
| 2010/0315946 | A1 | 12/2010 | Salam et al. | |
| 2011/0046826 | A1* | 2/2011 | Carroll | B61L 15/0027 701/19 |
| 2011/0149872 | A1* | 6/2011 | Carroll | H04W 36/0011 370/328 |
| 2011/0151864 | A1* | 6/2011 | Byun | H04W 36/30 455/426.1 |
| 2011/0222426 | A1* | 9/2011 | Chazel | B61L 15/0027 370/252 |
| 2011/0249552 | A1* | 10/2011 | Stokes | H04L 12/42 370/228 |
| 2011/0319071 | A1* | 12/2011 | Beppler | H04W 48/18 455/424 |
| 2013/0084859 | A1* | 4/2013 | Azar | H04W 48/08 455/435.1 |
| 2013/0201316 | A1* | 8/2013 | Binder | H04L 67/12 348/77 |
| 2013/0217419 | A1* | 8/2013 | Jodlauk | H04W 4/021 455/456.3 |
| 2013/0272269 | A1* | 10/2013 | Srivastava | H04W 36/30 370/332 |
| 2013/0308597 | A1* | 11/2013 | Murphy | H04L 12/4633 370/331 |
| 2013/0336275 | A1* | 12/2013 | Carroll | H04L 45/54 370/329 |
| 2013/0347073 | A1* | 12/2013 | Bryksa | H04L 63/105 726/4 |
| 2014/0005859 | A1* | 1/2014 | Baskin | G07C 9/00309 701/2 |
| 2014/0149547 | A1* | 5/2014 | Barker | H04W 48/20 709/217 |
| 2014/0245003 | A1* | 8/2014 | Barker | H04L 63/08 713/168 |
| 2015/0289148 | A1* | 10/2015 | Nolte | H04W 4/046 370/338 |
| 2016/0134501 | A1* | 5/2016 | Timms | H04L 47/34 370/252 |
| 2016/0295470 | A1* | 10/2016 | Timms | H04W 36/0083 |
| 2017/0353754 | A1* | 12/2017 | Vaclik | H04N 21/2187 |

OTHER PUBLICATIONS

Search Report Received for GB Patent Application No. GB1221423.5, date of search Jan. 13, 2014, 2 pages.

* cited by examiner

| Traffic Class | Maximum Latency | Data Packets |
|---|---|---|
| Conversational | <100ms | VoIP |
| Streaming | <1sec | Video streaming |
| Interactive | <2sec | Web browsing |
| Background | Best effort | Email |

COMMUNICATION METHOD

CROSS-REFERENCE TO RELATED APPLICATIONS

This application claims priority to United Kingdom Patent Application No. 1221423.5, filed on Nov. 28, 2012, the entirety of which is incorporated by reference herein.

BACKGROUND

Technical Field

The present invention relates to a method of communicating between a first device and a second device, the first device being connected to a plurality of third devices to which the second device is also connected.

Description of Related Art

With the increased portability of computers, and the increasing sophistication of mobile devices such as mobile telephones and palmtop computers, there is a growing demand for Internet connectivity while on the move. One response to this demand is based upon devices having built-in long-range telecommunications capabilities, such as devices which make use of mobile telephone networks. While such solutions can be effective, they typically suffer from problems of low bandwidth and incomplete geographic coverage. The problem of low bandwidth is a particular issue when a user wishes to access content comprising a large quantity of data (for example video content). The problem of incomplete geographic coverage is particularly problematic when a user is moving, given that data communication may be interrupted when a signal is lost (for example when a train enters a tunnel).

An alternative method of providing Internet connectivity to mobile devices is based upon the use of access points. Such access points may be provided, for example, in public buildings such as libraries and cafes, and can be accessed by mobile computing devices which are located within a predetermined range of the access point. One common technology used to allow mobile computing devices to connect to such access points is specified by IEEE standard 802.11, and is commonly referred to as WiFi. The use of access points in this way is advantageous in that it allows higher bandwidth connections to be established.

The limitations of systems based upon the connection of mobile devices to mobile telephone networks has led to the proposal that public transport vehicles, such as trains or buses, may be beneficially provided with wireless access points, such that mobile computing devices used by passengers traveling in the vehicle can be provided with Internet connectivity.

The provision of Internet connectivity to a vehicle can be specially tailored to cope with the routes traveled by the vehicle, such as through tunnels and cuttings. More power is available on the vehicle than on a mobile computing device, meaning that systems fitted to vehicles can generally support larger, higher gain antennas than those that are generally installed in portable user devices such as mobile telephones. Furthermore, greater computational power can be used in signal processing in a device associated with a vehicle given that there is room for larger, more powerful processing devices.

Different types of communication links can be used to provide data communication to a vehicle, separately or together, appropriate to the locations through which the vehicle travels. Furthermore, if a vehicle's route is known, the communication links can be managed to provide a higher level of service with greater bandwidth, lower latencies, and fewer losses of connection than if the communications were made directly to individual users using a mobile telephone network. It follows that the provision of a wireless access point on board a vehicle has considerable advantages. Such provision does, however, bring challenges.

It is known to place a number of base stations along a known route, for example alongside a train track. It is further known to connect each base station to a home server via appropriate connections, for example land-based cables or wireless mobile telephone networks. The home server may be connected to the Internet via standard means, for example via cable or via a digital subscriber line (DSL). A communication control unit is placed on the vehicle. As the vehicle travels along the route, the communication control unit wirelessly connects to a particular base station. In this way, the communication control unit can connect to the Internet through the home server, routed via the base stations and any intermediate devices in the network. The communication control unit is adapted to distribute the Internet connection to devices within the vehicle, allowing users to connect to the Internet whilst onboard the vehicle.

Known systems, however, suffer from performance disadvantages through their failure to make most effective use of available resources, such as connections with base stations and other devices. There is therefore a need for methods of providing data communications to a moving object, such as a vehicle, that provide improved performance.

BRIEF SUMMARY

It is an object of embodiments of the invention to obviate or mitigate at least some of the problems outlined above.

According to a first aspect of the present invention, there may be provided a method of determining suitable communication paths between a first device and a second device, the first device being connected to a plurality of third devices to which the second device may be also connected, comprising at the first device: for each of the third devices obtaining first information indicating a characteristic of communications between the first device and the second device via the third device; obtaining second information associated with first data to be transmitted from the first device to the second device; and determining based upon the first and second information whether any of the third devices should receive the first data for communication of the first data to the second device.

The first aspect therefore allows for a determination as to whether, or not, any, or none, of the third devices should receive the first data, that determination being based both upon information associated with the first data and characteristics of communications using particular ones of the third devices. The first aspect therefore also allows selection of the most appropriate ones of the third devices for receipt of the first data, or indeed, determination that none of the third devices are suitable for receipt of the third data. Further processing of the first data can therefore be advantageously based upon the determination.

The first information may be a time value. For example, the first information may be a latency value associated with the third device, and may be a round trip time between the first device and the second device via the third device.

Obtaining the second information associated with the first data may comprise determining a quality of service characteristic of the first data. The quality of service characteristic may indicate a tolerance of the first data to disruption. For example, the quality of service characteristic may indicate a tolerance of the first data to latency.

The method may further comprise assigning a traffic class to the first data based upon the second information. The assigned traffic class may comprise an indication of a maximum latency.

Determining whether any of the third devices should receive the first data may comprise selecting one of the third devices to receive the first data. For example, if it is determined that a particular one of the third devices should receive the first data, that third device may be selected to receive the third data. The first data may then be transmitted to the selected third device for the selected third device to forward the first data to the second device.

Determining whether any of the third devices should receive the first data may comprise determining that none of the third devices should receive the first data. That is, the first and second information may be such that none of the third devices should receive the first data. In this case, the first data may not be sent to any of the third devices and may be discarded.

The method may further comprise ceasing communication of second data between the first device and one of the third devices, and selecting the one of the third devices to communicate the first data. In this way, while it may be the case that none of the third devices should receive the first data, by ceasing communication of second data between the first device and one of the first devices, that one of the first devices may become suitable for receiving the first data.

The second data may have associated second information and the second information associated with the second data may be different to the second information associated with the first data. For example, the second data may be more tolerant to disruption than the first data. The second information associated with the second data may indicate the greater tolerance to disruption of the second data.

The method may further comprise transmitting the second data from the first device to a different one of the third devices.

The first device may be aboard a vehicle. For example, the first device may be aboard a train, other form of public transport vehicle, or indeed personal transport vehicle. The third devices may be along a route travelled by the vehicle. For example, where the vehicle is a train, at least some the third devices may be along a track. At least some of the third devices may be base stations provided by mobile data carrier companies.

The first data to be transmitted from the first device to the second device may be received at the first device from a fourth device. For example, the first data may be received from a user device such as a smartphone, a tablet computer, a laptop computer or any other form of personal electronics device capable of generating network data.

The method may further comprise, upon receipt of the first data from the fourth device: obtaining third information indicating whether the first data belongs to an existing communications session or flow between the first device and the second device; and determining whether one of the third devices should be used to communicate the third data to the second device may be based upon the first, second and third information. The session or flow between the first device and the second device may actually be a session or flow between the fourth device and a fifth device that takes place via the first and second devices. For example, the fourth device may be a mobile phone and the fifth device may be a web-server, where the mobile phone establishes a web session with the web-server via the first and second devices.

The terms communications session and communications flow should be understood to mean any logically connected transmissions of data between two devices. Example sessions may be TCP sessions, UDP sessions or VoIP sessions, but may be any interrelated communications between two devices. Sessions and flows are sometimes known as conversations, dialogues or meetings between two devices.

According to a second aspect of the present invention, there is provided apparatus for determining suitable communication paths between a first device and a second device, the first device being connected to a plurality of third devices to which the second device may be also connected, comprising: means for obtaining for each of the third devices first information indicating a characteristic of communications between the first device and the second device via the third device; means for obtaining second information associated with first data to be communicated from the first device to the second device; means for determining based upon the first and second information whether any of the third devices should receive the first data to forward the first data to the second device.

According to a third aspect of the present invention, there is provided a method for providing network connections aboard a vehicles, comprising: at a first device aboard a first vehicle providing a first virtual network to which at least one second device can connect: entering a first operational mode in which data transmitted by said at least one second device over said first virtual network is received by said first device; detecting the presence of a third device aboard a second vehicle, said third device being adapted to also provide said first virtual network to which said at least one second device can connect; and entering a second operational mode in which data transmitted to said virtual network is not received by said first device.

In this way, the first device aboard the first vehicle provides two modes of operation. In a first mode, the first device provides a virtual network and receives data sent over the first virtual network. When the first device detects the presence of a third device, the third device also providing the first virtual network, the first device no longer receives data sent over the first virtual network. Therefore, while both the first and second devices can provide the first virtual network, only one of the first and second devices receives data sent over the first virtual network. Problems with routing and processing data if both devices were to receive data from the virtual network at the same time, are thereby avoided.

The first device and the second device may each be further arranged to provide a second virtual network to which the at least one second device can connect and in each of the first and second operational modes the first device may be arranged to receive data transmitted by the at least one second device over the second virtual network.

In this way, the first device provides two virtual networks. In the first mode, the virtual device receives data transmitted on both virtual networks, while in the second mode, the first device receives data transmitted on the second virtual network, but not the first. This allows the first device and the third device to share responsibility for receiving data sent over the first and second virtual networks, thereby providing more flexibility, and resilience to failure of either of the first or third devices.

The at least one second device may comprise a plurality of second devices and the method further may comprise: while the first device may be in the second operational mode; receiving data at the first device on the second virtual network from a first one of the second devices; and receiving data at the third device on the first virtual network from a second one of the second devices.

The first vehicle may comprise a first plurality of access points and the second vehicle may comprise a second plurality of access points, and the method further may comprise:
at the first device in the first operational mode:
maintaining a connection with each of the first plurality of access points but not the second plurality of access points and accepting connection by the at least one second device to the first virtual network via at least one of the first plurality of access points; and
at the first device in the second operational mode:
maintaining a connection with each of the first and second plurality of access points but not accepting connection by the at least one second device to the first virtual network via any of the first and second plurality of access points.

The method may further comprise, at the first device in the second operational mode: accepting connection by the at least one second device to the second virtual network via at least one of the first access points and/or at least one of the second access points.

The first and second vehicles may be the same vehicle. For example, the first and second vehicles may be respective carriages of a train. Where the first and second vehicles are the same vehicle, the first device and the third device may be connected via an inter-carriage wired link.

Alternatively, the first and second vehicles may be different vehicles. Detection of the third device may occur during a transient proximity of the vehicles. For example, the first and second vehicles may be transiently proximate at a train station, or train stop.

Alternatively, the first and third devices may be aboard separate train carriages which are temporarily connected.

The method may further comprise receiving an indication that the third device meets a predetermined criterion. Entering the second operational mode may be a response to receiving the indication. For example, the predetermined criterion may be that a rank of the third device is higher than a rank of the first device.

The first virtual network may be a virtual LAN. The first virtual network may be any other kind of virtual network.

The method may further comprise detecting an absence of the third device and entering the first operational mode. For example, having entered the second mode, the second vehicle may leave the proximity of the first vehicle, causing the first device to detect absence of the third device. The first device may then re-enter the first mode in order to provide receive data on the first virtual network. In this way, while the at least one second device may have transmitted data to the third device on the first virtual network, after departure of the third device, the at least one second device can continue to transmit data on the first virtual network, that data being received by the first device.

The method may further comprise, at the first device: detecting a presence of a fourth device, the fourth device also adapted to provide the first virtual network to which the at least one second device can connect; and determining that the fourth device does not meet the predetermined criteria and remaining in the first operational mode.

Each of the first device, third device and fourth device may be, for example, routers or switches.

According to a fourth aspect of the present invention, there is provided an apparatus for providing network connections aboard vehicles, comprising: a first device aboard a first vehicle, the first device being arranged to: provide a first virtual network to which at least one second device can connect; enter a first operational mode in which data transmitted by the at least one second device over the first virtual network may be received by the first device; detect the presence of a third device aboard a second vehicle, the third device being adapted to also provide the first virtual network to which the at least one second device can connect; and enter a second operational mode in which data transmitted According to a fifth aspect of the present invention, there is provided a method of transmitting data from a first device, the method comprising at the first device: establishing a connection with a first one of a plurality of second devices; establishing a first virtual connection, the first virtual connection being between the first device and a third device through said one of a plurality of second devices; receiving details of a second virtual connection, the second virtual connection being between a fourth device and the third device through a second one of the plurality of second devices, the fourth device being connected to the first device; selecting one of the first or second virtual connections for transmission of a data packet to the third device; and transmitting data to the third device using the selected connection.

In this way, the first device is able to select between two virtual connections with a third device, and may therefore select a preferred connection. The first and second ones of the plurality of second devices may be different second devices, such that the first and second virtual connections have different properties which may influence a selection between the first and second virtual connections.

Selecting one of the first or second virtual connections may comprise determining a latency of the first virtual connection and the second virtual connection. For example, receiving details of the second virtual connection may comprise receiving details of a latency of the second virtual connection from the fourth device. The details of a latency of the second virtual connection may be received in a first communication, the first communication being sent periodically from the fourth device to the first device.

The first communication may comprise latency information for a plurality of connections between the fourth device and said third device via different ones of said plurality of second devices. The first communication may comprise latency information for a plurality of connections from the fourth device to a plurality of third devices.

The selecting may be at least partly based upon respective latencies of the first and second virtual connections.

The method may further comprise determining at the first device a latency of the connection between the first device and the fourth device and the selecting may be at least partly based upon the latency of the connection between the first device and the fourth device.

The selection may be at least partly based upon a comparison of a latency of the first virtual connection with a combined latency of the second virtual connection and a latency of the connection between the first and fourth devices.

The method may further comprise selecting the second virtual connection and transmitting the data packet to the fourth device for transmission to the third device.

The first device and the fourth device may be housed in different carriages of a train. The first and fourth devices may be connected via an inter-carriage wired link. The first device and fourth device may be connected via a dedicated virtual LAN. In this way, the first device and fourth device can transmit communications such as the first communication containing connection information, robustly and without interference.

According to a sixth aspect of the present invention, there is provided an apparatus for transmitting data, the apparatus comprising: connection means for establishing a connection with one of a plurality of second devices; virtual connection means for establishing a first virtual connection, the first virtual connection being between the first device and a third device through the one of a plurality of second devices; connection means for establishing a connection with a fourth device; a receiver for receiving details of a second virtual connection, the second virtual connection being between the fourth device and the third device through one of the plurality of second devices; selection means for selecting one of the first or second virtual connections for transmission of a data packet to the third device; and a transmitter for transmitting data to the third device using the selected connection.

It will be appreciated that aspects of the present invention can be implemented in any convenient way including by way of suitable hardware and/or software. For example, a device arranged to implement the invention may be created using appropriate hardware components. Alternatively, a programmable device may be programmed to implement embodiments of the invention. The invention therefore also provides suitable computer programs for implementing aspects of the invention. Such computer programs can be carried on suitable carrier media including tangible carrier media (e.g. hard disks, CD ROMs and so on) and intangible carrier media such as communications signals.

It will be appreciated that features presented in the context of one aspect of the invention in the preceding and following description can equally be applied to other aspects of the invention. For example, embodiments or aspects described with reference to methods may be implemented by apparatus, and vice versa.

BRIEF DESCRIPTION OF THE DRAWINGS/FIGURES

An embodiment of the invention will now be described, by way of example, with reference to the accompanying drawings, in which.

DETAILED DESCRIPTION

Figure 1:
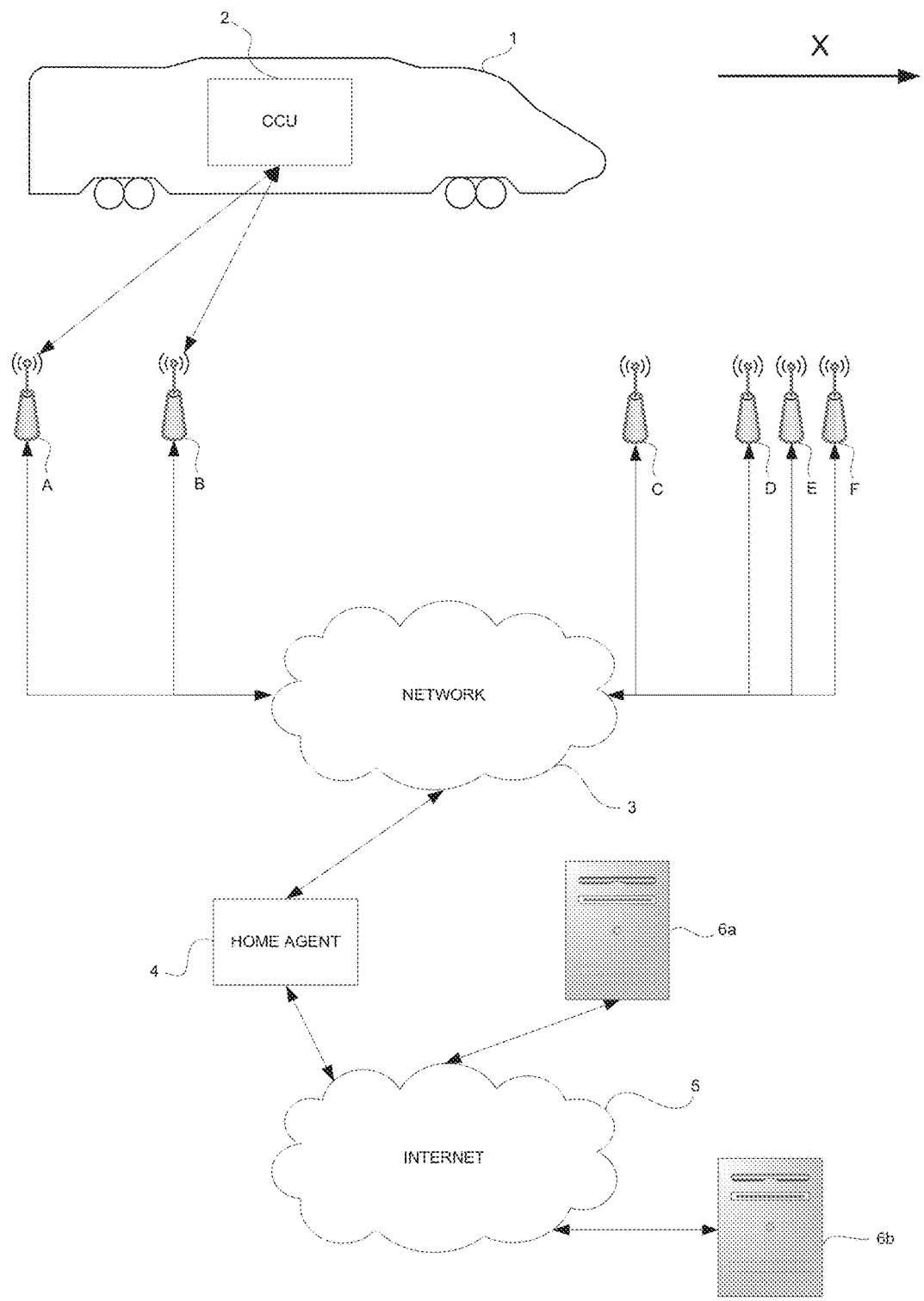
FIG. 1 is a schematic illustration of a network of computing devices.

FIG. 1 shows a network which is used to provide data communication to a train 1.

The train 1 is provided with a communications control unit (CCU) 2 which is arranged to connect to base stations A to F, each of which are connected to a network 3. Both the CCU 2 and the base stations A to F are provided with wireless communications interfaces to allow a wireless connection to be established between the CCU 2 and the base stations A to F. A home agent 4 is also connected to the network 3. Virtual communication tunnels are established between the CCU 2 and the home agent 4, using data packet encapsulation, so as to allow data packets to be securely exchanged between the CCU 2 and the home agent 4.

It will be appreciated that while FIG. 1 shows each of the base stations A to F directly connected to a single network 3, each base station A to F may be connected to one or more further networks which are in turn connected to the network 3. For example, the base station A may be connected to a 3G cellular network, while the base station B may be connected to an IEEE 802.16 (WiMax) network, each of which may be connected to the network 3. Further, while the Internet 5 and the network 3 are shown separately in FIG. 1, the network 3 may be connected to, and may at least partly include, the Internet 5.

The home agent 4 is connected to the Internet 5. Host computers 6a, 6b are also connected to the Internet 5. The connection of the CCU 2 to the home agent 4 through a communication tunnel means that from the point of view of computers connected to the Internet 5 (for example the host computers 6a, 6b), all traffic is seen to emanate from the home agent 4, such that computers connected to the Internet 5 need not be concerned with details of the communication between the home agent 4 and CCU 2. Instead, computers connected to the Internet 5 can simply deliver data packets to the home agent 4 which can then process received data packets to ensure that such data packets are properly forwarded to the CCU 2.

The CCU 2 is arranged to provide wireless network connectivity on board the train 1. In this way passengers travelling on the train 1 can use mobile computing devices (such as laptop and palmtop computers, for example) to connect to the CCU 2 and thereby obtain access to the Internet 5. The connection between the mobile computing devices and the CCU 2 can take any suitable form, but may be in accordance with IEEE standard 802.11 (WiFi).

As the train 1 moves in the direction shown by the arrow X, the CCU 2 connects to different ones of the base stations A to F. Each base station A to F has a finite area within which it can receive and transmit data, and it is preferred that the finite areas overlap, such that there is a time during travel of the train during which the train is able to communicate with more than one of the base stations A to F. In FIG. 1, the train 1, and therefore the CCU 2 is within the signal range of both of the base stations A, B and is connected to both of the base stations A, B.

Figure 2:
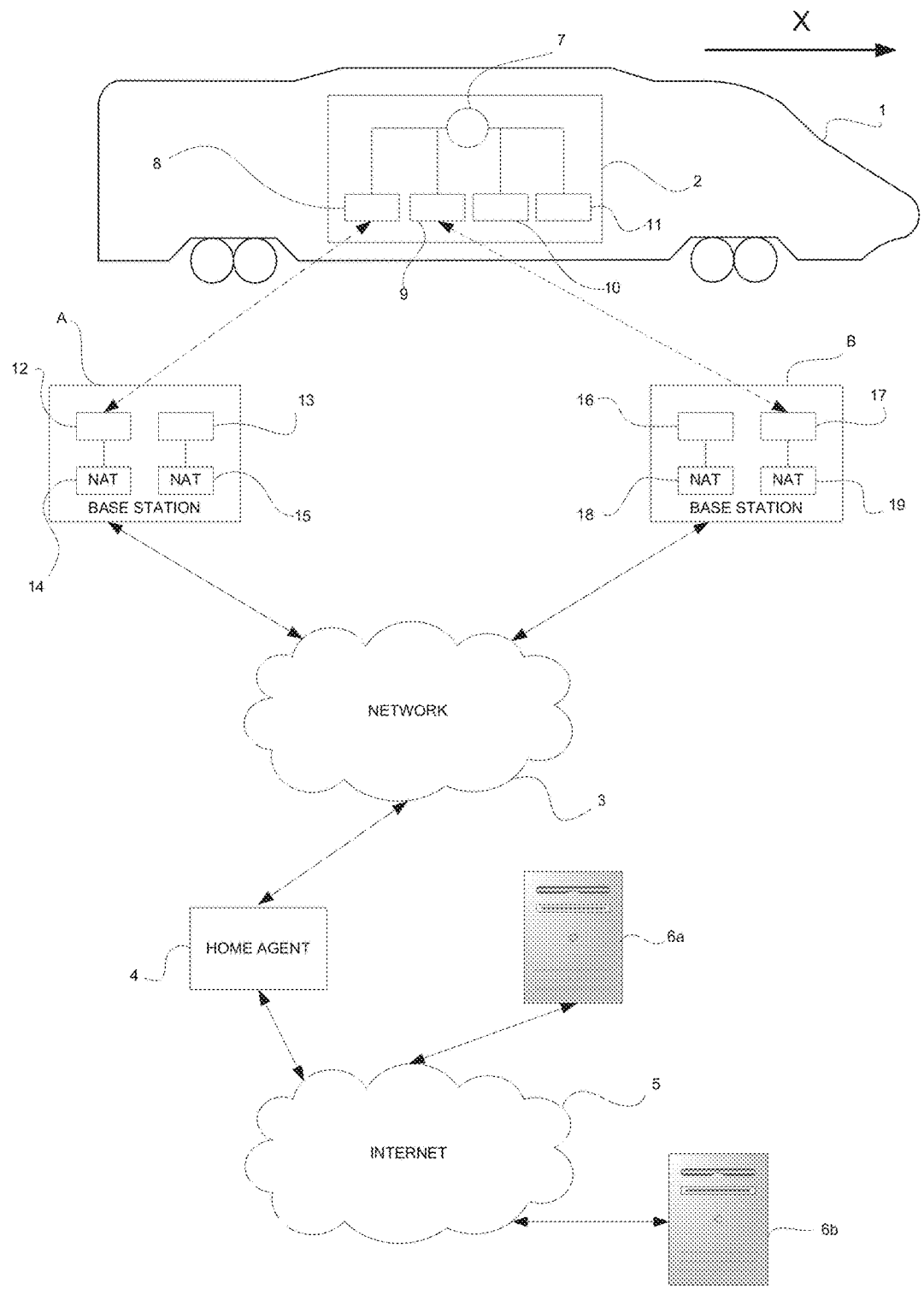
FIG. 2 is a schematic illustration showing components of the network of FIG. 1 in further detail.

FIG. 2 shows the network of FIG. 1, in which some components are shown in further detail. More particularly, it can be seen that the CCU 2 comprises a router 7 connected to four communication interfaces 8, 9, 10, 11. In the present embodiment, communication interfaces 8, 9, 10, 11 take the form of wireless bridges. Each of the wireless bridges 8 to 11 is arranged to transmit data at a respective frequency (which may be a predefined frequency, or may be a frequency which is selected when a connection using that wireless bridge is established). The CCU 2 is also provided with the ability to establish four communication tunnels between the CCU 2 and home agent 4. It will be appreciated that a CCU 2 may be provided with other numbers of wireless bridges, and/or other numbers of communication tunnels between the CCU 2 and the home agent 4, as appropriate.

The provided communication tunnels are distributed amongst the four wireless bridges 8, 9, 10, 11 which have a current connection with a base station. That is, communication tunnels are not distributed to wireless bridges not having a current connection with a base station, such that each communication tunnel is associated with a wireless bridge having a current connection with a base station, thereby rendering all communication tunnels operable.

The base station A is provided with two wireless bridges 12, 13, the wireless bridge 12 being arranged to transmit and receive data at a first frequency while the wireless bridge 13 is arranged to transmit and receive data at a second frequency. It will be appreciated that the first and second frequencies may be predetermined, fixed, frequencies, or alternatively, the wireless bridges 12, 13 may be adapted to select respective first and second frequencies upon establishment of a connection. For example, establishment of a connection between one of the wireless bridges 12, 13 and one of the wireless bridges 8 to 11 may initiate a handshake process by which the respective first and second frequencies are determined. The base station A further comprises two network address translation (NAT) devices 14, 15, such that the NAT device 14 is connected to the wireless bridge 12, while the NAT device 15 is connected to the wireless bridge 13.

The base station B is configured similarly to the base station A. More specifically, the base station B comprises two wireless bridges 16, 17 respectively arranged to transmit and receive data at different frequencies, and each of the wireless bridges 16, 17 is connected to a respective NAT device 18, 19. The NAT devices 14, 15, 18, 19 may be, for example, NAT capable network switches, such as a DI-604 available from D-Link Corporation, Taipei, Taiwan.

In FIG. 2, the wireless bridge 8 of the CCU 2 is connected to the wireless bridge 12 of the base station A, while the wireless bridge 9 of the CCU 2 is connected to the wireless bridge 17 of the base station B. Two of the four communication tunnels between the CCU 2 and the home agent 4 are assigned to the wireless bridge 8 while the remaining two of the four communication tunnels are assigned to the wireless bridge 9. In this way, the CCU 2 can transmit data packets to each of the base station A and the base station B, and thereby increase the bandwidth available for communication with the home agent 4.

Referring again to FIG. 1, as the train 1 moves in the direction of the arrow X, the strength of the signal at the CCU 2, first from the base station A, and then from the base station B will decrease, while the CCU 2 will move into the signal range of other base stations C, D, E, F. At a time when the CCU 2 is within range of the base stations A, B and C, the strength of the signal from the base stations A and C is comparable and relatively weak, while the signal from the base station B is relatively strong. In this case, the CCU 2 connects to all three of the available base stations A, B, C. For example, the bridge 8 of the CCU 2 may remain connected to the bridge 12 of the base station A, and the bridge 9 of the CCU 2 may remain connected to the bridge 17 of the base station B, while the CCU 2 establishes a connection between the bridge 10 of the CCU 2 and a free wireless bridge of the base station C. Upon connection with the base station C, one or more of the four communication tunnels between the CCU 2 and the home agent 4 are transferred to the wireless bridge connected to the bridge 10.

It will be appreciated that allocation of communication tunnels amongst the bridges 8 to 11 may be carried out in any convenient way. For example, communication tunnels may be distributed evenly (or as close to evenly as is possible) between the wireless bridges 8 to 11. Alternatively, communication tunnels may be assigned to respective ones of the wireless bridges 8 to 11 of the CCU 2 based upon relative signal strengths of connections or potential connections with respective base stations A to F and/or the amount of data currently being received/sent by the respective wireless bridges. For example, a single communication tunnel may be transferred from the wireless bridge 8 to the wireless bridge 10, leaving the wireless bridge 9 (having a relatively strong connection with the base station B) with two of the four communication tunnels. As the train 1 continues to move in the direction of the arrow X, the signal strength from the base station A decreases below a usable or predetermined limit with no further base stations being in range of the CCU 2, such that the remaining communication tunnel assigned to the wireless bridge 8 is transferred to the wireless bridge 10 which is connected to the base station C.

Referring again to FIG. 1, it can be envisaged that there may be a time at which the train will be within range of each of the base stations C, D, E, F. At this time, each of the wireless bridges 8 to 11 will connect to a respective one of the base stations C, D, E, F and each of the four communication tunnels will be assigned to a respective one of the wireless bridges 8 to 11. That is, each wireless bridge 8 to 11 will be assigned a single communication tunnel.

Tunnels may further be assigned based upon a measure of a cost of service of using a particular base station. For example, sending and receiving data packets via a base station in one location connected to a particular 3G network may incur a relatively high cost compared with the sending and receiving of a base station in a different location connected to the same 3G network. In this case, it may be desirable to preferentially allocate tunnels to particular wireless bridges 8 to 11 based upon a measure of the cost of using the base station to which that wireless bridge is connected.

Upon receipt of a data packet from mobile devices aboard the train 1, the CCU 2 determines to which of the currently connected base stations A to F, the received data packet is to be routed. In particular a process operating at the CCU 2 is adapted to receive data packets from mobile computing devices of users aboard the train 1 and to determine a suitable base station to which the CCU 2 is currently connected via which to transmit the received data packets to the home agent 4. It is known to use a combination of destination address and Equal Cost Multipath Routing (ECMP) to allocate received data packets to particular ones of the communication tunnels. Such implementations, however, may not, make efficient use of all available connections between the CCU and the base stations, depending upon network conditions and the nature of the data packets arriving at the CCU from user devices aboard the train 1.

Additionally, it is desirable to consider Quality of Service (QoS) requirements in the selection of base stations to which particular data packets are transmitted. For example, data packets carrying Voice-over-IP (VoIP) data have different QoS requirements than data packets carrying email data. It will be appreciated that various factors, such as the latency, maximum upload and maximum download bandwidth of a base station will affect the quality of service that can be provided by that base station at a particular time. For example, while the High Speed Downlink Packet Access (HSDPA) protocol can achieve theoretical data transmission speeds of 8 to 10 Mbps, cell modems perform adaptive modulation such that the actual bandwidth of a connection with a base station may vary dramatically from one moment to the next. As such, selection of base stations for forwarding of data packets according to QoS considerations presents particular challenges for the provision of communication to a vehicle.

In some embodiments of the present invention, the CCU 2 is configured to associate a latency with each base station to which it is currently connected. Latency may be determined by any appropriate means as will be readily apparent to those skilled in the art. For example, when the CCU 2 is connected to the base station A, the CCU 2 may determine a latency of the base station A by periodically (for example once per second) pinging the home agent 4 via the base station A. Alternatively, where data packets are already being transmitted between the CCU 2 and a base station, separate, dedicated, ping operations may be unnecessary. That is, where data packets are already being transmitted between the CCU 2 and the home agent 4 via a particular base station, the time taken for those data packets to reach the home agent 4 may be measured by the home agent 4 and reported to the CCU 2, while the time taken for reply data packets to reach the CCU 2 may be measured by the CCU 2. A latency may therefore be determined using existing communications. The round trip latency of each base station to which the CCU 2 is currently connected is recorded at the CCU 2 to be used as described below with reference to FIGS. 3a and 3b.

Figure 3A:
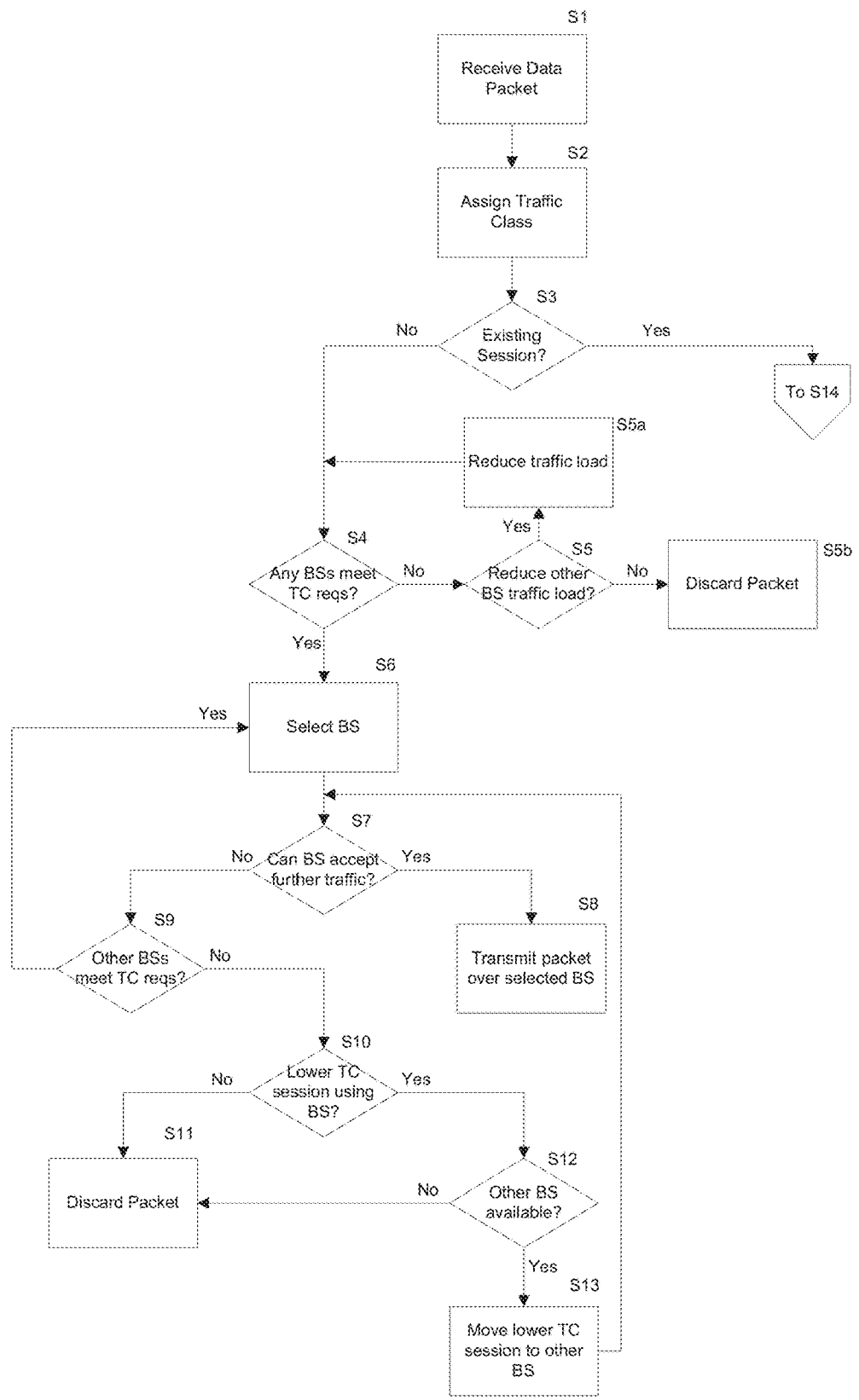
FIGS. 3a and 3b are flow charts illustrating processing carried out by a CCU of the network of FIG. 1 to route a data packet to a home agent.
Figure 3B:
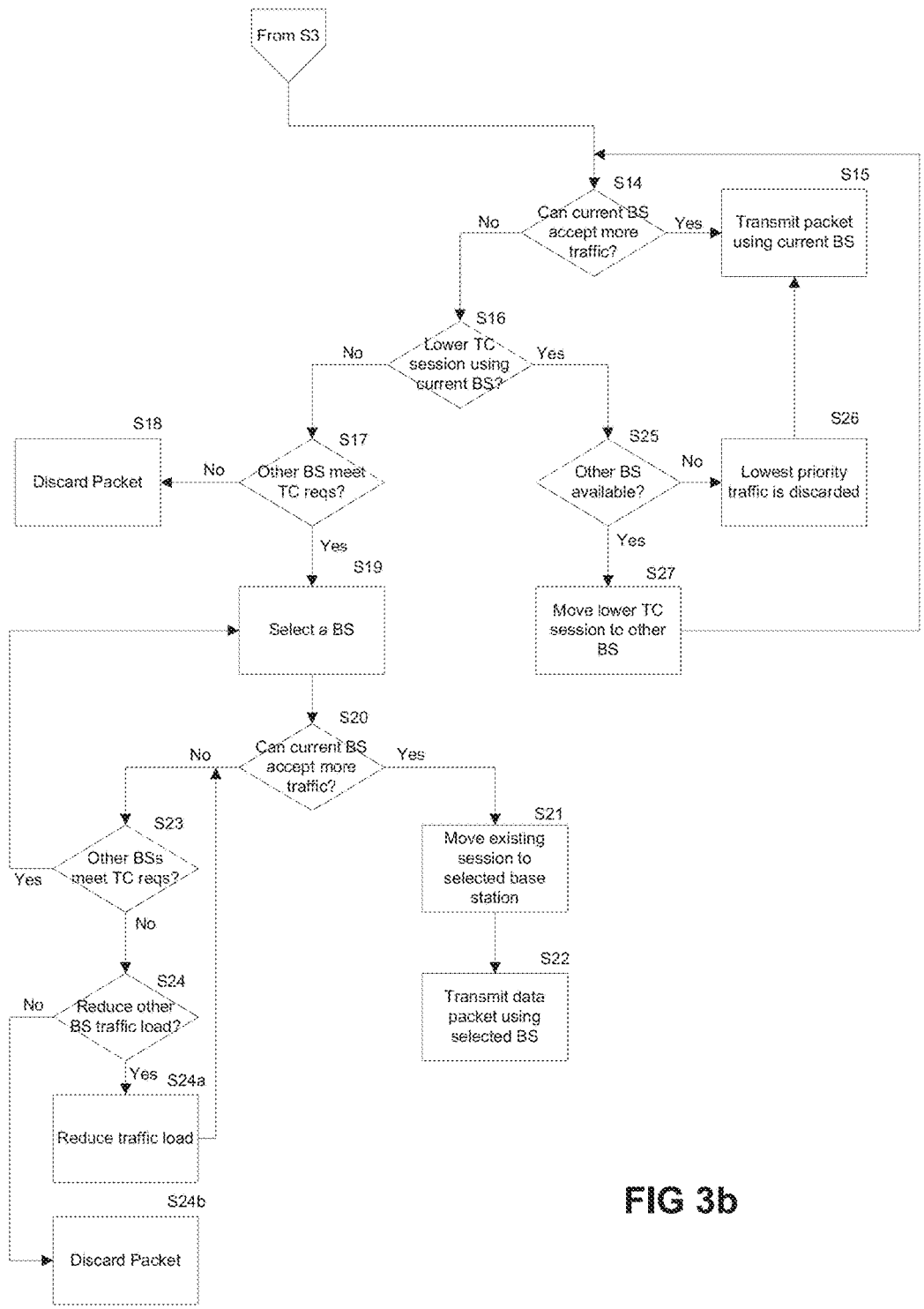

FIGS. 3a and 3b illustrate example processing carried out by the CCU 2 to determine a base station to which a data packet received from a user device should be transmitted. Referring to FIG. 3a, at step S1 a data packet is received by the CCU 2 from a mobile device aboard the vehicle 1. At step S2, the CCU 2 assigns a traffic class to the received data packet based upon a plurality of traffic class definitions at the CCU 2. Each traffic class definition specifies a maximum latency that a base station can have if that base station is to transmit data packets of that traffic class. The number of traffic classes and the maximum latency associated with each particular traffic class may be defined by an administrator of the CCU 2.

As the train 1 progresses along a track, connecting and disconnecting to respective base stations A to F, the difference between the best latency and the worst latency of the connected base stations may vary considerably. For example, while a CCU 2 may, at one point in time, be connected to base stations having a range of round trip latencies of between 300 ms and 100 ms, the CCU 2 may, at a later time, be connected to base stations having a range of latencies between 50 ms and 100 ms. In some embodiments of the invention, therefore, there may be an option to define the maximum latency with reference to latencies recorded at each of the currently connected base stations, rather than as a predetermined values. For example, a maximum latency for a high priority traffic class may be defined as a latency within the lowest 10% of latencies recorded at each of the currently connected base stations. To avoid low priority traffic competing for the best available latencies, some of the traffic classes may also specify a minimum latency value. For example, a lowest traffic class may specify a minimum latency value of within 10% of the highest round trip latencies recorded at each of the currently connected base stations.

Figures 4, 5:
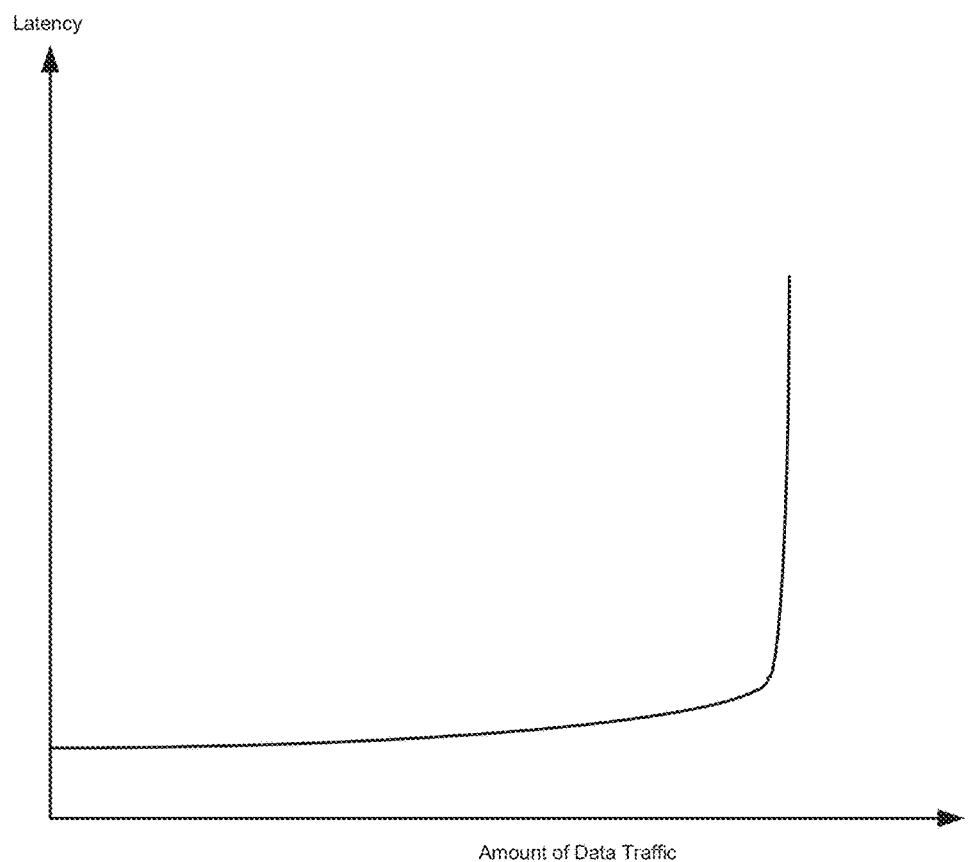
FIG. 4 is a schematic illustration of example traffic classes assigned to data packets by the CCU of the network of FIG. 1.
FIG. 5 is chart illustrating a relationship between latency and data traffic at a base station in the network of FIG. 1.

The assignment of a traffic class to a received data packet may be carried out using any appropriate method. For example, traffic classes may be based upon source or destination IP addresses, port numbers, communication protocols, subnets from which the data packet is received, or any other means as will be apparent to those skilled in the art. Referring to FIG. 4, four example traffic classes are shown. A "conversational" traffic class 30 is defined with a maximum latency of under 100 ms. Data packets carrying data that is highly intolerant to delays, for example Voice-over-IP (VoIP) data packets, may be assigned to the conversational traffic class 30 by the CCU 2. A "streaming" traffic class 31 is defined with a maximum latency of under 1 second. Data packets carrying data which is somewhat more tolerant to delays than data packets of the conversational traffic class 30, for example video streaming data packets (which may be buffered by the user device before display), are assigned to the streaming traffic class 31 by the CCU 2. An interactive traffic class 32 is defined with a maximum latency of under 2 seconds. Data packets carrying web browsing traffic are assigned to the interactive class 32. A "background" traffic class 33 is defined with no maximum latency. Data packets carrying data which is generally tolerant of delays, such as email data, is assigned to the background traffic class 33.

Referring again to FIG. 3a, from step S2, processing passes to step S3, at which it is determined whether the received data packet belongs to an existing session. If it is determined that the data packet is not part of an existing session, processing passes to step S4, at which it is determined whether any of the currently connected base stations meet the latency requirements of the traffic class assigned at step S2. If it is determined that none of the currently connected base stations have a latency that meets the requirements of the traffic class assigned at step S2 processing passes to S5 at which it is determined whether a traffic load of a base station that has traffic of a lower traffic class than the traffic class assigned at step S2 can be reduced, in order to reduce the latency of that base station. If it is determined that the latency of a base station can be reduced, processing passes to step S5a at which the latency of a base station is reduced in order to reduce the latency of that base station. Processing passes from step S5a back to step S4 to determine whether there is now a suitable base station. If, on the other hand, it is determined that traffic loads of other base stations cannot be reduced (for example because all base stations have only traffic of a higher traffic class than the traffic class assigned at step S2), processing passes to step S5b at which the data packet is discarded.

If, on the other hand, it is determined at step S4 that one or more of the currently connected base stations meet the latency requirements of the traffic class assigned at step S2, processing passes to step S6 at which one of the base stations meeting the latency requirements is selected. In the event that a plurality of the currently connected base stations meet the latency requirements of the data packet received at step S1, the base station selected at step S6 can be selected from that plurality in any appropriate way. For example, the CCU 2 may select the base station having the strongest signal strength, the lowest latency, or indeed by any other characteristic. Processing then passes to step S7 at which it is determined whether the selected base station can accept further traffic. In some embodiments of the present invention, a base station can accept further traffic if the latency is below the requirement of the session having the highest traffic class currently using that base station. In other embodiments of the invention, the processing at step S7 may determine whether transmitting the received data packet via the selected base station would be likely to cause the latency of the selected base station to exceed the maximum latency of the session having the highest traffic class currently using that base station.

Referring to FIG. 5, there is shown a representative line plot of a relationship between volume of data traffic at a base station and a latency of that base station. It can be seen that while a base station may tolerate increasing levels of data traffic without significant increases in latency up to a point. If more than one base station is available, any one of the available base stations may be selected using any appropriate method, after that point is reached the latency measured at that base station may increase rapidly. By measuring the actual relationships between data traffic and latency at particular base stations, embodiments of the present invention attempt to predict at step S7 whether further traffic is likely to cause a base station to reach a point at which latency increases significantly.

If it is determined, at step S7 that the selected base station can accept further data traffic, processing passes to step S8 at which the data packet received at step S1 is transmitted using the base station selected at step S6. If, however, it is determined that the selected base station cannot accept further traffic (either because the latency exceeds, or would exceed, the maximum allowed latency of the traffic session having the highest traffic class using that base station), processing passes to step S9. At step S9 it is determined whether others of the currently connected base stations meet the latency requirements of the traffic class assigned at step S2. If it is determined that others of the currently connected base stations do meet the requirements of the traffic class assigned at step S2, processing passes from step S9 back to step S6, at which a further base station is selected.

If, on the other hand, it is determined at step S9 that none of the other currently connected base stations meet the requirements of the traffic class assigned at step S2, processing passes to step S10 at which it is determined whether there is a session using the selected base station which has a lower traffic class than the traffic class assigned to the data packet received at step S1. If it is determined that no sessions using the current base station have a traffic class lower than the traffic class assigned to the data packet received at step S1, processing passes to step S11 at which the data packet received at step S1 is discarded.

If it is determined at step S10 that there is a session using the selected base station which has a lower traffic class than the traffic class assigned to the data packet received at step S1, processing passes to step S12 at which it is determined whether other base stations are available to transmit the lower traffic class session. That is, while it has been determined at steps S6 and S9 that neither the selected base station, nor others of the currently connected base stations meet the latency requirements of the traffic class assigned to the data packet received at step S1, it may be that one or more of the currently connected base stations do meet the latency requirements of other sessions currently using the selected base station.

In some embodiments of the present invention, it will be determined at step S12 that other base stations are available if those other base stations currently meet the latency requirements of both the lower traffic class session operating on the currently selected base station and the latency of the session having the highest traffic class currently using the other base station. In other embodiments, it may be necessary to determine whether, after the lower traffic class session station is moved to the other base station, the other base station will continue to meet the latency requirements of the highest traffic class session currently using the other base station.

If it is determined, at step S12, that another base station is available, processing passes to step S13 at which the lower traffic class session is moved to the other available base station. If more than one base station is available, any one of the available base stations may be selected using any appropriate method. Processing passes from step S13 back to step S7 at which it is determined whether, following the transfer of the lower traffic class session to a different base station, the base station selected at step S6 can now receive further traffic. If, on the other hand, it is determined at step S12 that no other base stations are available, processing passes from step S12 to step S11 at which the packet received at step S1 is discarded.

If, at step S3, it is determined that the data packet received at step S1 is part of an existing session, processing passes to step S14 (in FIG. 3b). At step S14 it is determined whether the base station being used by the existing session can accept further traffic. Determination as to whether the base station being used by the existing session can accept further traffic may be carried out in the same way as the determination at step S7 of FIG. 3a. A current base station may not be able to accept further traffic for a plurality of reasons. For example, as the train 1 moves in the direction of the arrow X causing the CCU 2 to connect to different base stations along the route, a session which started out being transmitted via one base station may have been moved to a different base station. As such, the latency of the base station on which the session is being transmitted may be greater than the latency of the base station over which the session was originally being transmitted.

If it is determined that the current base station can accept further traffic, processing passes to step S15 at which the data packet is transmitted over the current base station. If, on the other hand, it is determined that the current base station cannot accept further traffic, processing passes from step S14 to step S16 at which it is determined whether there are lower traffic class sessions operating on the current base station. If it is determined that no other sessions operating on the current base station have a lower traffic class than the session to which the data packet received at step S1 belongs, processing passes to step S17 at which it is determined whether others of the currently connected base stations meet the latency requirements assigned to the data packet received at step S1. If it is determined that none of the currently connected base stations meet the latency requirements of the data packet received at step S1, processing passes to step S18 at which the data packet received at step S1 is discarded.

If, on the other hand, it is determined at step S17 that at least one other of the currently connected base stations meets the latency requirements of the data packet received at step S1, processing passes to step S19 at which one of those other base stations is selected in the manner described above with reference to step S6. Processing passes from step S19 to step S20 at which it is determined whether the base station selected at step S19 can accept further traffic. If it is determined that the selected base station can accept further traffic, processing passes to step S21 at which the existing session to which the data packet received at step S1 belongs is moved to the base station selected at step S19. Processing then passes to step S22, at which the data packet received at step S1 is transmitted over the base station selected at step S19.

If, on the other hand, it is determined at step S20 that the selected base station cannot accept further traffic, processing passes to step S23 at which it is determined whether others of the currently connected base stations meet the latency requirements of the traffic class assigned to the data packet received at step S1. If it is determined that others of the currently connected base stations do not meet the latency requirements of the traffic class assigned to the data packet received at step S1, processing passes to step S24 at which it is determined whether a traffic load of a base station that has traffic of a lower traffic class than the traffic class assigned at step S2 can be reduced (e.g. by moving that traffic to a different base station). If it is determined that the latency of a base station can be reduced, processing passes from step S24 to step S24a at which the traffic load of a base station is reduced in order to reduce the latency of that base station. Processing passes from step S24a back to step S23 to determine whether others of the currently connected base stations now meet the latency requirements of the traffic class assigned to the data packet. If, on the other hand, it is determined that traffic loads of other base stations cannot be reduced (for example because all base stations have only traffic of a higher traffic class than the traffic class assigned at step S2), processing passes to step S24b at which the data packet is discarded.

If it is determined at step S23 that others of the currently connected base stations do meet the latency requirements of the traffic class assigned to the data packet received at step S1, processing passes from step S23 to step S19.

If it is determined, at step S16, that there are sessions with a lower traffic class than the data packet received at step S1 using the same base station as the session to which the data packet received at step S1 belongs, processing passes to step S25. At step S25, it is determined whether there are other base stations available to which the lower traffic class traffic sessions can be transferred. If it is determined that no other base stations are available, processing passes to step S26 at which sufficient data packets having a lowest traffic class are dropped from the current base station in order to allow transmission of the data packet received at step S1. Processing passes from step S26 to step S15 at which the data packet is transmitted using the current base station.

If, on the other hand, it is determined that other base stations are available, processing passes to step S27 at which one of the lower traffic class sessions is transferred to one of the other available base stations. Processing passes from step S27 back to step S14.

It will be appreciated that the example processing of FIGS. 3a and 3b allow, where possible, a received data packet to be transmitted over a base station that can support the latency requirements of the traffic class assigned to the data packet, and to avoid the transmission of a data packet over a base station which cannot support the latency requirements of the traffic class assigned to the base station. Where a data packet cannot be transmitted over a base station which meets the latency requirements of the traffic class assigned to the data packet, the data packet can be discarded.

As described above, details of the connection between the home agent 4 and the CCU 2 need not be considered by computers connected to the Internet 5. It will be appreciated, however, that the home agent 4 needs to be able to properly route data packets to and from the CCU 2, as the CCU 2 connects to different base stations along the route of the train 1. One known method for determining routes uses the router information protocol (RIP). This protocol can be used to propagate changes in routes to be followed from the CCU 2 to the home agent 4 through the network. The propagation of route changes is triggered when the base station to which the CCU 2 is connected changes. It will, however, be appreciated that such propagation will take some time, and there is a danger that some data packets will be incorrectly routed. Furthermore, in such an arrangement a CCU is able to receive data from only a single base station at a particular point in time. Such an approach also suffers from problems from the point of view of scalability. Similar problems exist for other dynamic routing protocols, such as the Open Shortest Path First protocol (OSPF).

One method for routing response data packets from the home agent 4 to the CCU 2 requires modifying the header of each data packet sent by the CCU 2 at the NAT device of the base station at which that data packet is received. That is, the respective NAT devices of the base stations A to F are arranged to receive data packets from their respective wireless bridge and forward such data packets onwards over the network 3. As is well known, data packets often include a header including a first field identifying a source of the data packet and a second field identifying the destination of the data packet. Routinely, data packets generated by the CCU 2 will include within their headers data indicating the address of the CCU 2 as a source address.

In the presently described embodiment, data packets received at the NAT devices are encapsulated Internet Protocol (IP) data packets. The IP data packets include a field indicating an IP address of a device from which the data packet emanated (i.e. the CCU 2). The NAT devices can be arranged to modify received data packets before the data packets are forwarded over the network 3, by modifying the source address within the data packets to identify the NAT device rather than the CCU 2. In this way, the home agent 4 receives data packets which appear (based upon their source address) to emanate from one of the NAT devices, not from the CCU.

When NAT devices are used in this way, the home agent 4, and indeed any other devices connected to the network 3 need not take any action to modify routes which data packets follow when the CCU 2 (i.e. one of the wireless bridges 8 to 11 of the CCU 2) connects to a different base station. Instead, upon receipt of a data packet the home agent 4 stores data indicating from which NAT device that data packet was received and forwards data packets intended for the CCU 2 to the indicated NAT device. In this case, however, problems may arise when the CCU 2 connects to a base station from which data packets have a relatively short round trip time (RTT) between the home agent 4 and that base station, from a base station from which data packets have a relatively long RTT between the home agent 4 and that base station.

Figure 6:
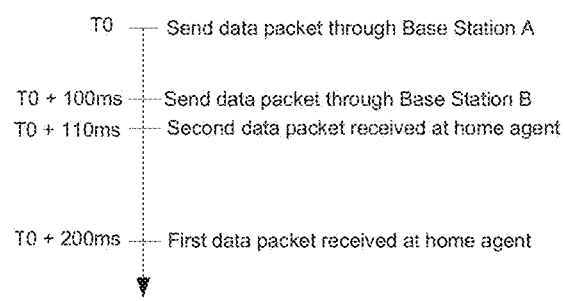
FIG. 6 is a timing diagram showing processing of data packets in known systems.

For example, as illustrated in FIG. 6, at time T0 the CCU 2 sends a data packet through base station A which, for the purposes of this example, has a RTT of 400 ms with the home agent 4 (i.e. it takes approximately 200 ms for a data packet to reach the home agent 4). The CCU 2 connects to, and sends a second data packet through base station B 100 ms later, the base station B having a RTT of 20 ms with the home agent 4. The home agent 4 receives the second data packet first at 110 ms after time T0, and updates its records to indicate that data packets should be sent to the CCU 2 via the second base station. However, 90 ms later at T0+200 ms, the home agent receives the first data packet and updates its records to indicate, incorrectly, that data packets should be sent to the CCU 2 via the first base station. That is, the method described above routes data packets based upon the order of receipt at the home agent 4, not order of transmission of data packets from base stations. It will be appreciated that this is problematic in that data packets transmitted from the home agent 4 may not be optimally routed.

Therefore, in some embodiments of the present invention, the CCU 2 is adapted to provide information in the encapsulated IP data packet to indicate which base station should be used to transmit data packets to the CCU 2. Further, each data packet sent by the CCU 2 is provided with a time stamp indicating when that data packet was transmitted. That is, each data packet emanating from the CCU 2 includes an identifier of a particular base station, a time stamp and an identifier of the CCU 2 within a header portion of that data packet. As described above, the home agent 4 maintains a record of which base station is associated with the CCU 2 at any particular time.

Figure 7:
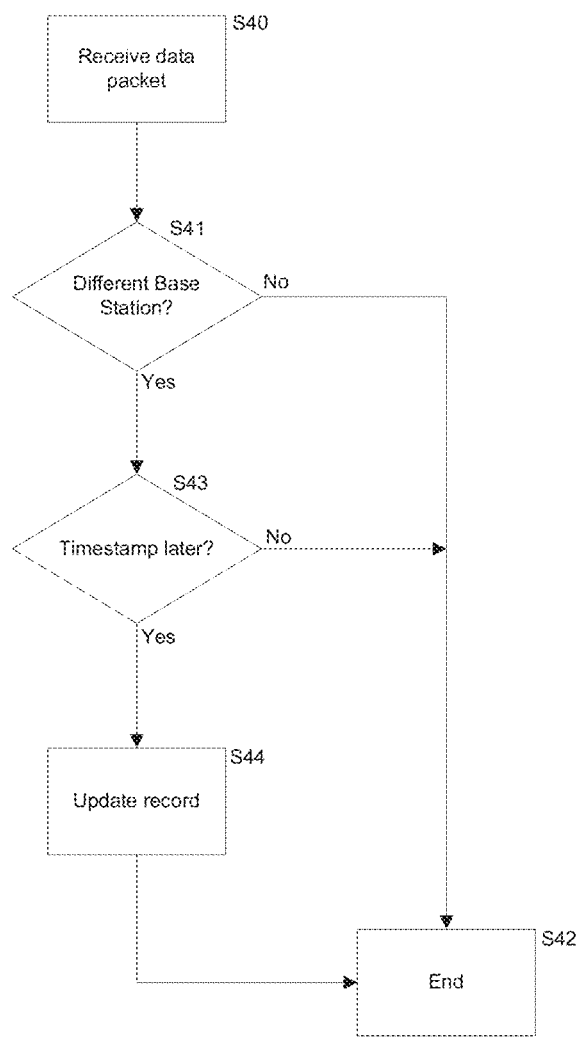
FIG. 7 is a flowchart showing processing carried out by a home agent of the network of FIG. 1 upon receipt of a data packet.

FIG. 7 shows the processing carried out at the home agent 4 to update data indicating which base station is associated with a particular tunnel of the CCU 2 at any particular time. At step S40 the home agent 4 receives a data packet from a tunnel of the CCU 2. At step S41 the home agent 4 determines if the base station indicated in the received data packet is different to the base station currently associated with the tunnel of the CCU 2. If it is determined that the base station indicated in the received data packet is the same as the base station currently associated with the tunnel of the CCU 2, processing ends at step S42.

If, on the other hand, it is determined that the base station indicated in the data packet is different to the base station currently associated with the tunnel of the CCU 2, processing passes to step S43. At step S43, it is determined whether the time stamp included in the received data packet is later than the time stamp of the last data packet which last caused the tunnel of the CCU 2 to be associated with a base station. If the time stamp of the received data packet is not later than the time stamp of the last data packet which caused the home agent 4 to update the base station association data for the tunnel of the CCU 2, processing ends at step S42. That is, if the time stamp of the received data packet is not later than the time stamp of the last received data packet to cause an update of the base station association data, it can be inferred that the currently recorded base station is the base station which the CCU 2 has most recently chosen to use for that particular tunnel.

If, on the other hand, the time stamp of the data packet is later than the time stamp associated with the last update operation, processing passes to step S44 at which the home agent 4 updates the base station association data for the tunnel of the CCU 2 indicating that data packets should be sent to the base station indicated in the received data packet. Processing passes from step S44 to end at step S42.

Figure 8:
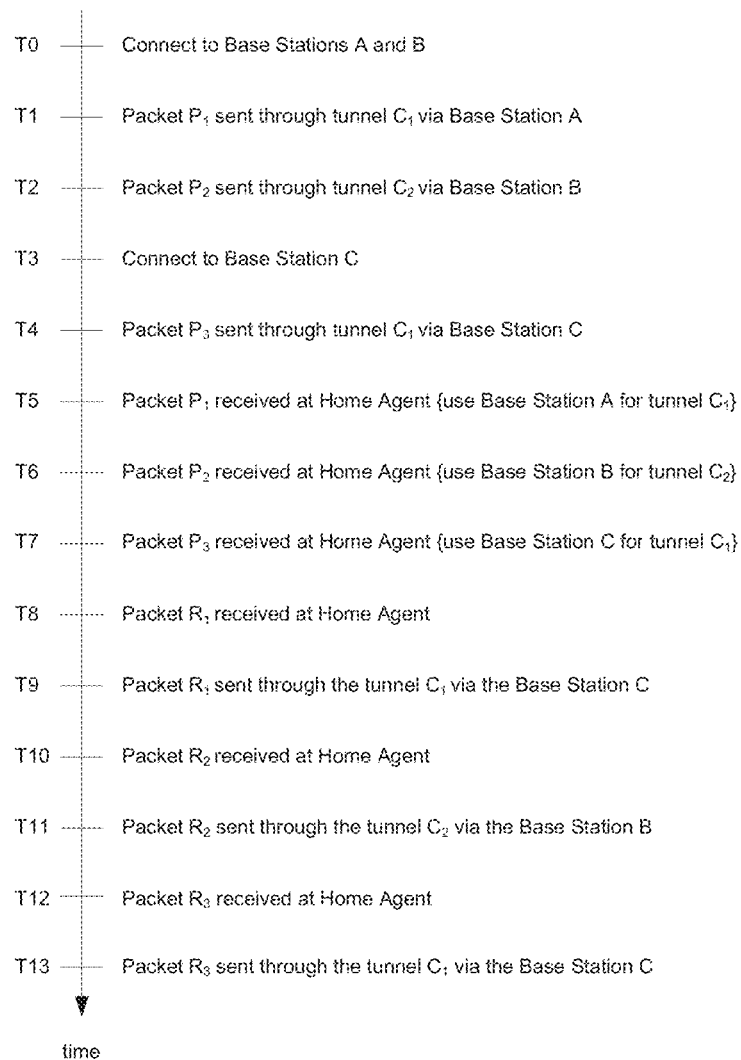
FIG. 8 is a timing diagram showing the processing of data packets in the network of FIG. 2.

FIG. 8 is a schematic illustration showing a transfer of data packets between the CCU 2 and the home agent 4 utilising two communication tunnels as the CCU 2 connects to different base stations. It is to be understood that where it is described below that communication tunnels are allocated to base stations, this indicates that communication tunnels are allocated to wireless bridges of the CCU 2 which are currently connected to those base stations. In the example of FIG. 8, it should be understood that the CCU 2 has two available communication tunnels.

At time T0, the CCU 2 connects to the base stations A and B. A first communication tunnel $C_1$ is allocated to the base station A while a second communication tunnel $C_2$ is allocated to the base station B. It is to be assumed that the base station A has a RTT to the home agent 4 of 1, while the base station B has a RTT of 50 ms.

At time T1, the CCU 2 receives a data packet from a client device aboard the vehicle 1 requesting a web page from the host 6*a*. Using the example traffic classes shown in FIG. 4, as the data packet received at time T1 requests a web page, the data packet is assigned to the 'interactive' traffic class 32. The CCU 2 determines that the data packet received at time T1 does not belong to an existing session, and that the base station A meets the requirements of the interactive traffic class 32. The base station A can accept further traffic and a data packet $P_1$ is therefore transmitted using the communication tunnel $C_1$ (which is associated with the base station A) for forwarding to the home agent 4, the data packet $P_1$ indicating that reply data packet should be sent via the base station A.

At time T2, the CCU 2 receives a VoIP data packet from a client device to be forwarded to the host 6*b*. The CCU 2 assigns the 'conversational' traffic class 30 to the data packet $P_2$ and determines that the base station B meets the requirements of the conversational traffic class 30. The base station B can accept further data traffic and, as such, the data packet $P_2$ is transmitted using the communications tunnel $C_2$ (associated with the base station B) for forwarding to the home agent 4, the data packet $P_2$ indicating that reply packets should be sent via the base station B.

At time T3, the CCU 2 loses connection with the base station A and connects with the base station C. The tunnel $C_1$ is therefore allocated to the base station C, which has a RTT to the home agent 4 of 500 ms. At time T4, a client device initiates e-mail communication with the host 6*a* by way of a data packet $P_3$. The CCU 2 assigns the 'background' traffic class 33 to the data packet $P_3$ and determines that the base station C meets the requirements of the background traffic class 33. The data packet $P_3$ is transmitted using the communications tunnel $C_1$ (associated with the base station C) for forwarding to the home agent 4, the data packet $P_3$ indicating that reply data packets should be sent to the base station C.

At time T5, the data packet $P_1$ is received at the home agent 4. The home agent 4 examines the header of the data packet $P_1$ and updates its record to indicate that data packets sent through the communication tunnel $C_1$ should be sent via the base station A. The data packet $P_1$ is forwarded to the host 6*a*.

At time T6, the data packet $P_2$ is received at the home agent 4. The home agent 4 examines the header of the data packet $P_2$ and updates its record to indicate that data packets to be sent to the CCU 2 through the communication tunnel $C_2$ should be sent via the base station B. The data packet $P_2$ is forwarded to the host 6*b*.

At time T7, the home agent 4 receives the data packet $P_3$, and updates its record to indicate that data packets to be sent to the CCU 2 through the communication tunnel $C_1$ should be sent via the base station C. The data packet $P_3$ is forwarded to the host 6*a*.

At time T8, the home agent 4 receives a data packet $R_1$ from the host 6*a* in response to the data packet $P_1$, and determines from the routing table, that the data packet $R_1$ should be sent to the CCU 2 via the base station C, despite the data packet P₁ having been received at the home agent 4 from the base station A.

At time T9, the home agent 4 forwards the data packet R₁ to the CCU 2 through the tunnel C₁ via the base station C.

At time T10, the home agent receives a data packet R₂ in response to the data packet P₂ from the host 6*b*, and at time T11 forwards the data packet R₂ through the tunnel C₂ to the CCU 2 via the base station B.

At time T12, the home agent receives a data packet R₃ in response to the data packet P₃ from the host 6*a* and at time T13 forwards the data packet R₃ through the tunnel C₁ to the CCU 2 via the base station C.

Figure 12:
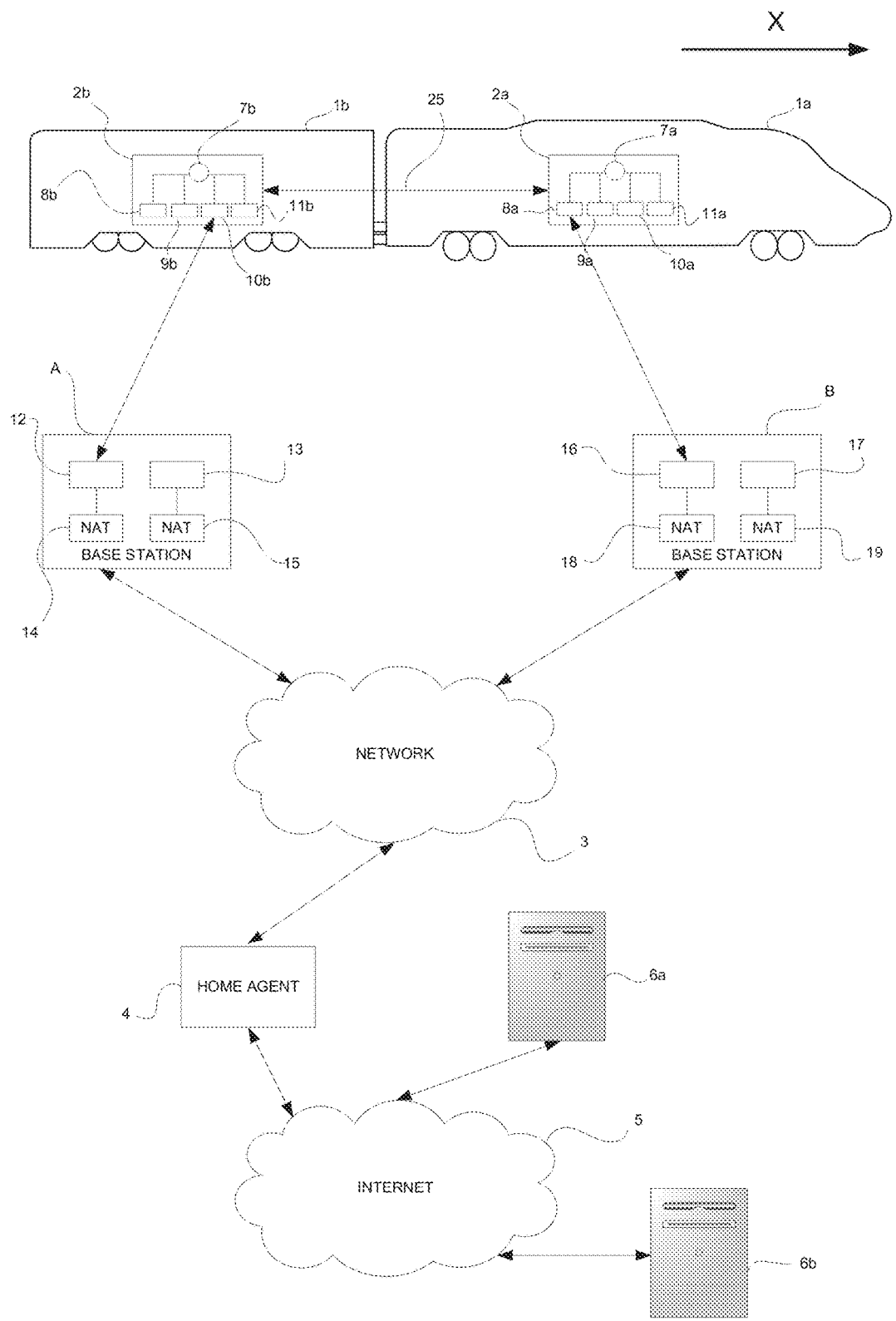
FIG. 12 is a schematic illustration showing the components of the network of FIG. 8 in further detail.
Figure 13:
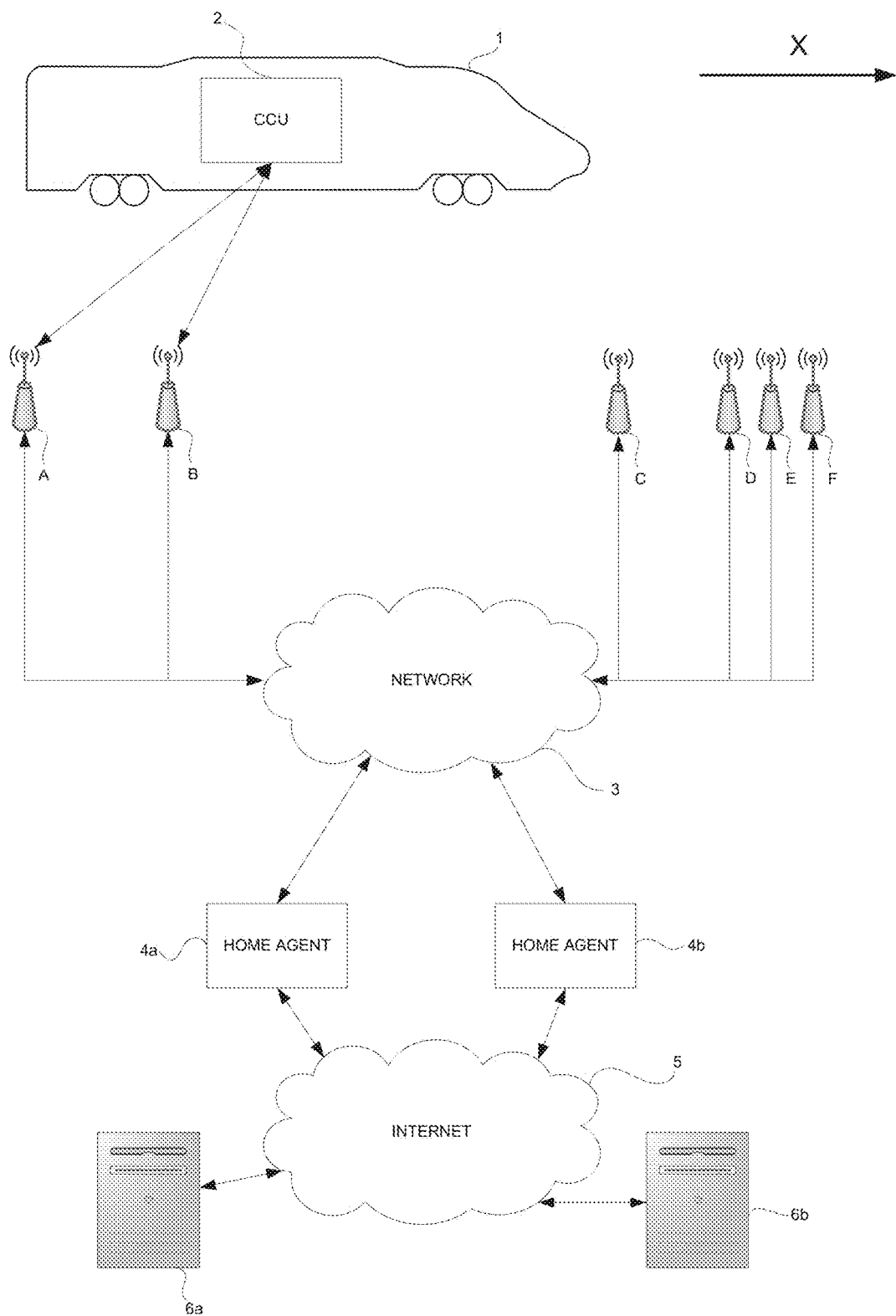
FIG. 13 is a schematic illustration showing the network of FIG. 1 with an additional home agent.
Figure 14:
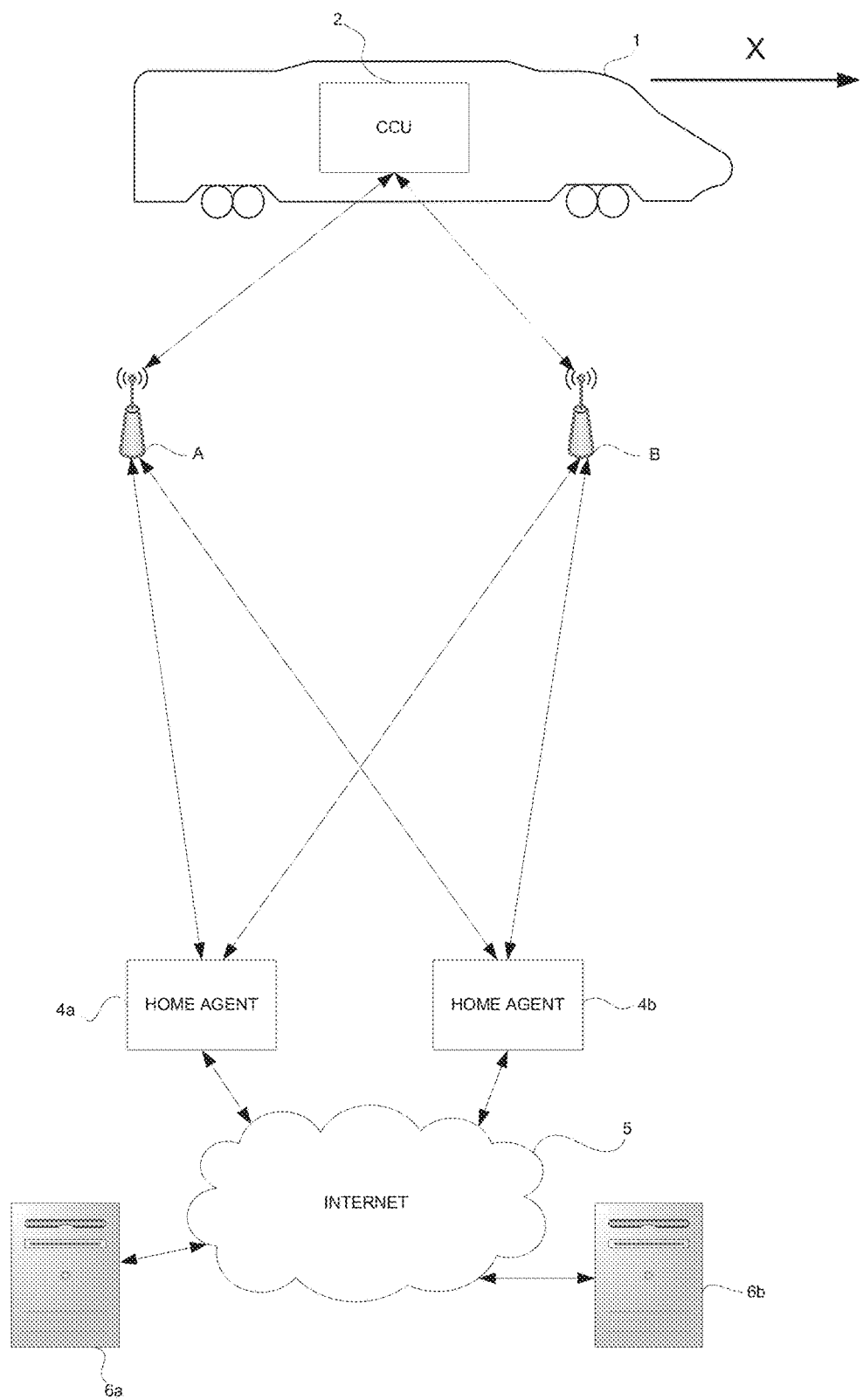
FIG. 14 is a schematic illustration showing part of the network of FIG. 13.

While the above described embodiment uses a single home agent 4, in other embodiments of the present invention, multiple home agents may be provided. In FIGS. 12 and 13, there is generally illustrated the network of FIG. 1 but having two home agents 4*a*, 4*b*. Where a plurality of home agents are provided, the CCU 2 establishes a communication tunnel with the home agent having the lowest RTT with a particular base station to which the CCU 2 is connected. The CCU 2 may periodically poll the home agents to which it is not currently connected in order to determine whether communication tunnels should be transferred to other home agents.

In the above described embodiments, a single CCU 2 is provided aboard a single train 1. In other embodiments of the present invention multiple CCUs may be, or may become, associated with a single train. The association of multiple CCUs with a single train may be deliberate or accidental. For example, multiple CCUs may be provided aboard a train to provide improved connectivity for users aboard the train. Where a train provides only a single CCU, multiple CCUs may accidentally become associated with the train when the train is in the vicinity of other trains carrying one or more CCUs (for example when two trains are next to each other at a station). Furthermore, trains are often re-assembled using different carriage configurations, which may lead, intentionally or unintentionally, to a single train being provided with multiple CCUs.

Figure 9:
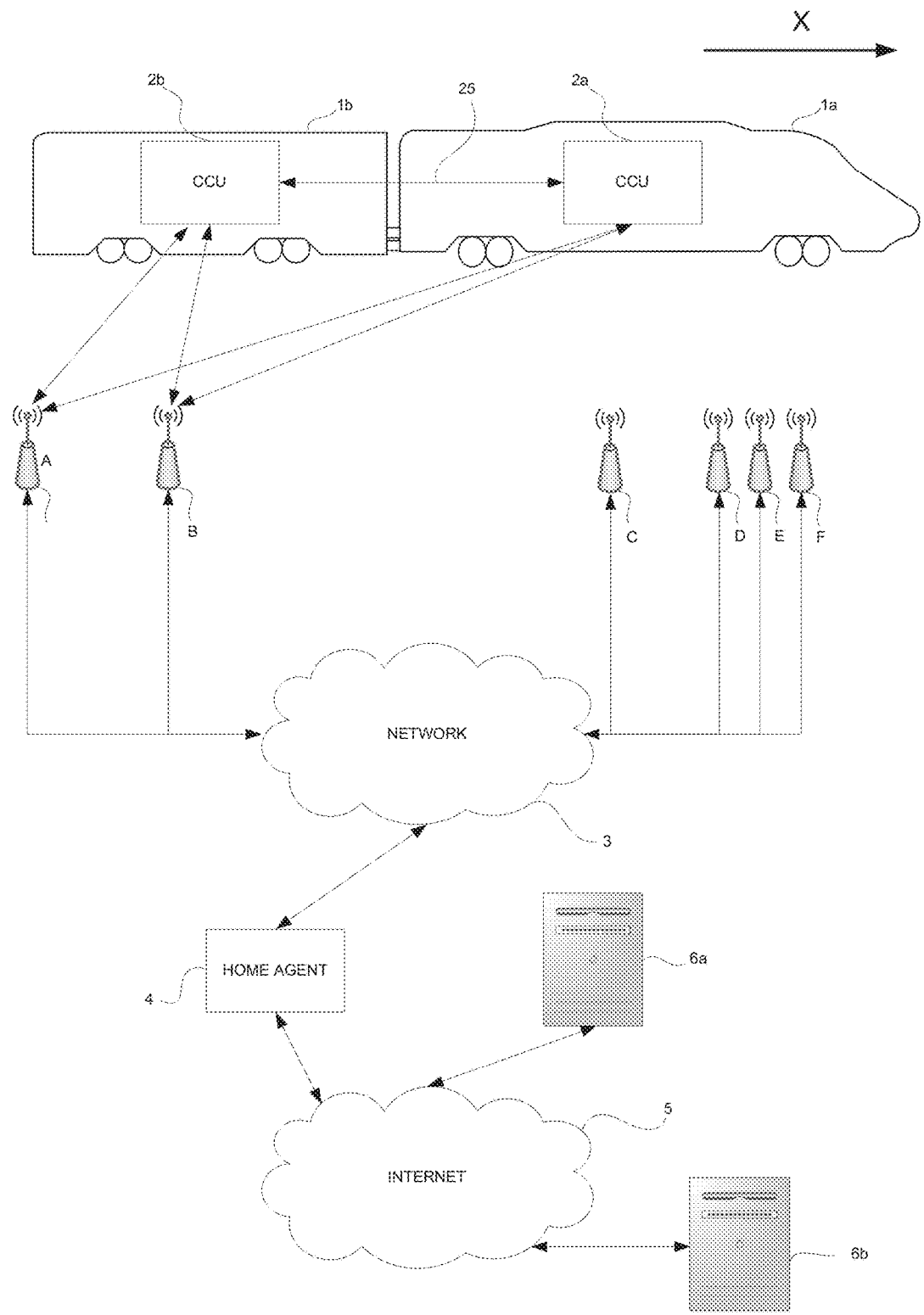
FIG. 9 is a schematic illustration showing the network of FIG. 1 with an additional CCU.

Referring to FIG. 9, there is generally illustrated the network of FIG. 1 but in which two CCUs 2*a*, 2*b* are associated with the train 1. In more detail, the train 1 comprises two carriages 1*a*, 1*b*. The carriage 1*a* houses the CCU 2*a* while the carriage 1*b* houses the CCU 2*b*. The CCUs 2*a*, 2*b* are connected via a connection 25 which may be a wired or a wireless connection, or indeed a combination of both. For example, the connection 25 form part of a connection "backbone" of the train 1, comprising wired connections and wireless bridges (for example to allow connection between carriages) by which the CCU 2*a* and CCU 2*b* to connect.

Figure 10:
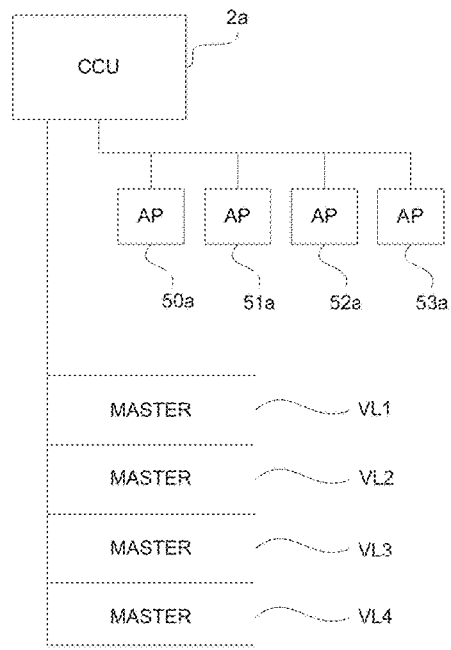
FIG. 10 is a schematic illustration of a plurality of Virtual Land Area Networks (VLANs) provided by a CCU of the network of FIG. 8.

Each CCU 2*a*, 2*b* is configured to provide a plurality of virtual LANs (VLANs) to which user devices aboard the train 1 can connect via the at least one physical communication interface provided by that CCU. Referring to FIG. 10, there is shown an example in which the CCU 2*a* is associated with four communication interfaces 50*a* to 53*a* in the form of wireless access points provided aboard the train 1. The CCU 2*a* is configured to provide four VLANs, VL1, VL2, VL3 and VL4. Traffic from each VLAN is sent to a respective one of the access points 50*a* to 53*a*. In particular, the communication interface 50*a* is configured to listen for traffic on VL1, the communication interface 51*a* is configured to listen for traffic on VL2, the communication interface 52*a* is configured to listen for traffic on VL3, while the communication interface 53*a* is configured to listen for traffic on VL4. User devices aboard the train 1 connecting to ones of the communication interfaces 50*a* to 53*a* thereby connect to one of the VLANs VL1 to VL4. For example, where the train 1 is a four carriage train, user devices aboard each carriage may be able to connect to a single respective one of the communication interfaces 50*a* to 53*a*. It will be appreciated that in other embodiments, one or more of the communication interfaces 50*a* to 53*a* may be configured as part of the same VLAN.

While not connected to another CCU, the CCU 2*a* acts as the master for each of the four VLANs that it provides. That is, any data traffic sent from a user device to one of the VLANs VL1, VL2, VL3, VL4 will be sent by the communication interfaces 50*a* to 53*a*, to the CCU 2*a*. Where it is associated with a different, single, train, the CCU 2*b* is configured similarly to that of the CCU 2*a*. That is, the CCU 2*b* is also configured to provide four VLANs, VL1, VL2, VL3, VL4 to the users aboard the train with which the CCU 2*b* is presently associated.

Each of the CCUs 2*a*, 2*b* is further configured to provide a fifth VLAN to be used for inter CCU communication. The inter-CCU VLAN is a private and dedicated VLAN used to pass both control traffic, and traffic from user devices aboard the train to be sent from one CCU to the other, as is described in more detail below. The inter-CCU VLAN is consistent across all CCUs, to allow those CCUs to connect to each other and to communicate using the inter-CCU VLAN. It is also preferable that the inter-CCU VLAN is configured to have a maximum VLAN priority so as to ensure that traffic is expeditiously transmitted across any intermediate devices connecting two CCUs (for example wireless bridges). Preferably, no other equipment would be configured to use the inter-CCU VLAN except to ensure that traffic broadcast on the inter-CCU VLAN is quickly passed between CCUs.

Each CCU 2*a*, 2*b* periodically broadcasts its presence on the inter-CCU VLAN by transmitting, for example, a UDP broadcast packet on the inter-CCU VLAN. Each CCU 2*a*, 2*b* is further configured to listen for such UDP broadcast packets in order to determine whether any other CCUs are present. The inter-CCU broadcast packets generally comprise:

the MAC address of the network interface of the CCU used to communicate on the inter-CCU VLAN (unique to each CCU).

Figure 11:
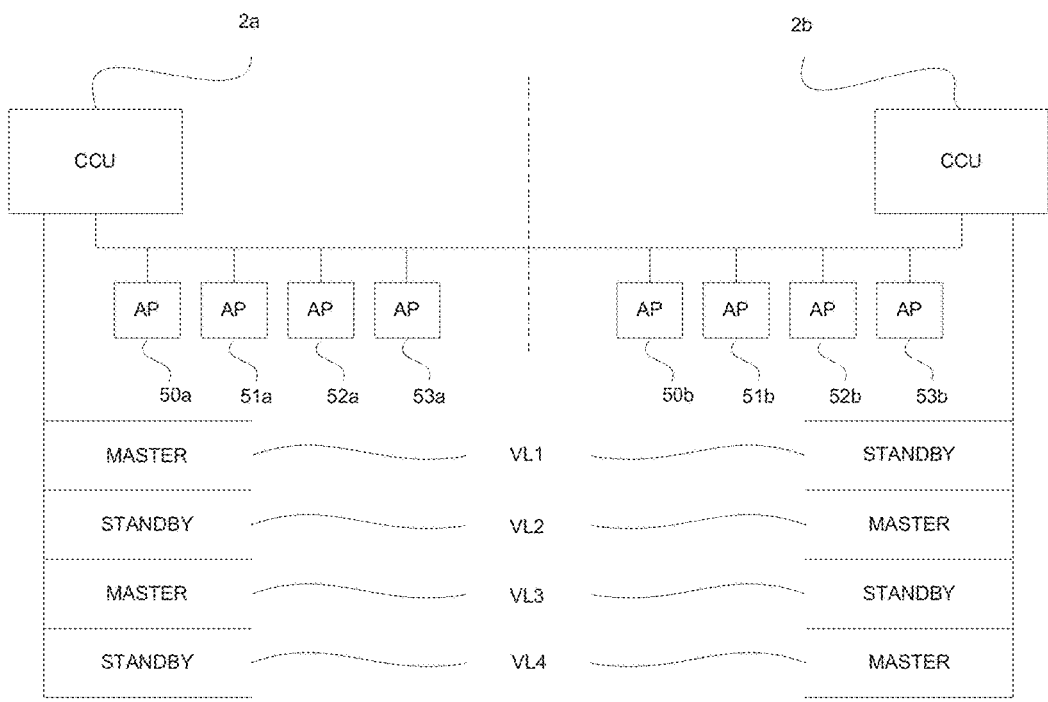
FIG. 11 is a schematic illustration of a plurality of Virtual Land Area Networks provided by both of the CCU's of FIG. 8.

IP address of the CCU on the inter-CCU VLAN the MAC addresses of other detected CCUs Upon detection of the presence of another CCU, the CCUs 2*a*, 2*b* are arranged to adopt a master/standby arrangement, with one of the CCUs 2*a*, 2*b* acting as a master for one or more of the VLANS. For each of the VLANS for which one CCU 2*a*, 2*b* is the master, the other of the CCUs 2*a*, 2*b* acts as a standby. Referring to FIG. 11, there is shown an arrangement in which the CCU 2*a* and the CCU 2*b* are both associated with the train 1 (which situation may occur, for example, where a train on which the CCU 2*a* resided and a train on which the CCU 2*b* resided become coupled). As in the arrangement of FIG. 10, the user devices aboard the train 1 are presented with four VLANs, VL1, VL2, VL3, VL4. In the arrangement of FIG. 11, however, the CCU 2*a* is the master for VL1, VL3 and is the standby for VL2, VL4, while the CCU 2*b* is the master for VL2, VL4 and the standby for VL1, VL3. For example, in the configuration illustrated in FIG. 11, the CCU 2*a* may serve passengers in a first-class carriage, while the CCU 2*b* serves passengers in a second-class carriage.

The allocation of master and standby roles to each of the CCUs 2a, 2b for each of the VLANs is based upon the MAC addresses provided in the inter-CCU broadcasts. That is, the reported MAC address (and the MAC address of other detected CCUs) are used to create an ordered ranking of connected CCUs on which the decision as to which CCU should be a master or standby can be based. For example, the CCU with the "highest" MAC address may be automatically elected as the master CCU for VLAN 1, while the CCU with the second "highest" MAC address may be elected as the master CCU for VLAN 2, etc. It will be appreciated however, that master/standby roles may be assigned by any appropriate method. For example, priorities may be assigned to each of the CCUs 2a, 2b for each of the VLANs that it is configured to provide. The CCU with the highest priority for a particular VLAN assumes the role of master for that VLAN. In this way, assignment of priorities may be performed by a system administrator having regard to reliability and capabilities of particular CCUs. It will be appreciated, however, that this would require that each CCU that may connect with another CCU is configured with a separate priority for each VLAN.

The allocation of master and standby roles to each CCU is performed over the inter-CCU VLAN in order to expedite the process. This is particularly advantageous given that connections between CCUs along or between a train can be intermittent, particularly where wireless network hops are used. For this reason also, it may be preferable to carry out the allocation of master and standby roles relatively infrequently.

Where both CCUs 2a, 2b are available, data sent to one of the VLANs VL1, VL3 will be processed by the CCU 2a, while data sent to one of the VLANs VL2, VL4 will be processed by the CCU 2b, thereby providing effective load-balancing between the CCU 2a and CCU 2b. In the event that the CCU 2a, for example, becomes unavailable, the CCU 2b will become the master CCU for the VLANs VL1, VL3. As such, in addition to load balancing, where multiple CCUs are provided aboard a single train, or while two or more trains are proximate, resiliency to failure can also be provided through redundancy.

While the example described above with reference to FIGS. 9 to 11 considers the presence of two CCUs, any number of CCUs may be provided, such that, more standby CCUs can be provided for each VLAN or additional VLANs can be provided. For example, where three CCUs are connected, each VLAN would have two standby CCUs. It should further be appreciated that while in the example described above each of the CCUs 2a, 2b is the master of at least one VLAN, in other configurations one of the CCUs 2a, 2b may be the master for all of the VLANs, while the other of the CCUs 2a, 2b is the standby for all of the VLANs. The particular arrangement of whether each CCU assumes a master role for some VLANs or whether a single CCU assumes a master role for every VLAN will depend upon the particular circumstances in which the present invention is deployed.

Each CCU 2a, 2b is connected/able to connect to each of the access points 50a-53a and 50b-53b (using a wired or wireless connection), such that, if one of the CCUs 2a, 2b fails or moves out of range of the other CCU 2a, 2b, users who are connected to a particular access point 50a-53a or 50bs-53b, maintain their connection with that access point, but the access point may now connect to a different CCU.

In some embodiments of the present invention, multiple CCUs may also be used to provide redundancy and load balancing for external connections (e.g. to bearer networks).

A plurality of connected CCUs may be adapted to provide information concerning their respective external connections to each other. For example, referring to FIG. 12, there is shown the network of FIG. 9 with some components shown in further detail. In particular, it can be seen that the CCU 2a comprises four communication interfaces 8a to 11a, each connected to a router 7a. The CCU 2b comprises four communication interfaces 8b to 11b, each connected to a router 7b. In FIG. 12, the communication interface 9a is connected to the wireless bridge 16, while the communication interface 10b is connected to the wireless bridge 12.

Each CCU 2a, 2b is arranged to provide details of its external connections, including details of the latencies recorded for each connection, to the CCUs to which it is connected using the inter-CCU VLAN described above. For example, each CCU's inter-CCU broadcast UDP packet may also contain details of the external connections of that CCU. The broadcast UDP packet may further indicate the particular mechanism being used by that CCU to route client traffic to the home agent 4.

There is now described an example use of external network sharing using the example routing described above, in which each CCU 2a, 2b is configured to determine a round trip time for data packets sent to a home agent via each base station in order to allow for base stations to be selected based upon QoS considerations, and in particular, traffic classes assigned to each data packet. As such, when performing the processing of FIGS. 3a, 3b to determine which connection to use to transmit a particular data packet of a particular traffic class, the CCU 2a, for example, is able to consider its connection with the base station B, but also the connection between the CCU 2b and the base station A. In this way, if the CCU 2a requires additional capacity (because, for example, the base station A cannot meet the latency requirements of a data packet it has received from a user device), the CCU 2a can send data packets to the CCU 2b for transmission to the base station B.

In some embodiments of the present invention, each CCU 2a, 2b may be configured to favour its own connections where they meet the requirements of data packets to be transmitted. For example, in the processing of FIGS. 3a, 3b, where at steps S4/S6 and/or S17/S19, it is determined by the CCU 2a that base stations to which it is directly connected and base stations to which it is connected via the CCU 2b both meet the latency requirements of a data packet to be transmitted, the CCU 2a may attempt to use each base station to which it has a direct connection before attempting to use base stations to which it is connected via another CCU.

Alternatively, each CCU 2a, 2b may favour base stations having a latency considered optimal according to some predetermined criteria. For example, each traffic class may define an optimal latency for that traffic class and each CCU 2a, 2b may, for a data packet with a particular traffic class, favour base stations having a latency closest to that optimal latency. Alternatively, each CCU may favour base stations having the lowest latency of all of its available base stations. In determining a lowest latency, it may be necessary to consider any latency associated with the connection 25 between the CCU 2a and the CCU 2b. In some embodiments, therefore, when a CCU is selecting a base station to which to send a data packet, the latency between itself and other CCUs is taken into account. For example, referring to FIG. 12, if the round-trip time between the communication interface 10b and the base station A is 100 ms, and the round-trip time between the CCU 2*a* and the CCU 2*b* is 20 ms, the CCU 2*a* will assign a round-trip time of at least 120 ms to the base station A.

A plurality of connected CCUs may be configured such that only a subset of the connected CCUs can utilise the external connections of other CCUs. For example, referring to FIG. 12, the CCUs 2*a*, 2*b* may be configured such that the CCU 2*b* is able to use the external connections of the CCU 2*a*, but such that the CCU 2*a* is unable to use the external connections of the CCU 2*b*. Such a configuration may be desirable where a higher quality and consistency of service is to be provided to some users aboard the train 1, for example those travelling in a first-class carriage.

It will be appreciated that while useful in combination, the aggregation of external connections (i.e. to base stations) between CCUs need not be accompanied by the provision of internal VLANs as described with reference to FIGS. 10 and 11. Indeed, one of the CCUs 2*a*, 2*b* may be configured such that it does not provide any internal communication interfaces, but merely shares external connections with another CCU.

Further, while the above example describes sharing of external connections in which each CCU routes data packets based upon a traffic class assigned to each data packet and based upon round-trip-times of connections between that CCU and the home agent 4 via particular base stations A to F, in other embodiments, one or more connected CCUs may implement routing based upon different criteria. For example, routing of client data packets to the home agent may be based upon the destination IP address of those data packets. Where routing of client data packets is based upon different criteria to that described above, decisions made by a particular CCU about whether to use an external connection of another CCU to route client data packets, may also be based upon different criteria.

Before establishment of a communication tunnel between a CCU and a home agent, the CCU and the home agent communicate, for example using TCP, to determine the appropriate attributes of the communication tunnel to be established. It will be appreciated that the attributes of the communication tunnel may depend upon a number of factors including the networks over which the communication tunnel is provided and the requirements for use of the communication tunnel. Example attributes agreed by the CCU and the home agent may include an encryption algorithm for use in encrypting data packets transmitted via the communicate tunnel, a compression factor for data transmitted via the communication tunnel and a maximum transmission unit (MTU) size.

Referring to FIGS. 2 and 12, it was explained that the communication interfaces 8 to 11, 8*a* to 11*a*, 8*b* to 11*b* on board the train 1 are connected to a routers 7, 7*a*, 7*b*. These communication interfaces are Layer 2 devices. To prevent problems, such as broadcast storms, arising from bridging loops between the CCU and the base stations, each bridge is separated from each other bridge by means of Layer 3 devices, such that each Layer 2 bridge is only accessible via a separate IP address. The separation of Layer 2 devices may be achieved by any appropriate means, such as the use of port based virtual LANs, or by connecting each bridge through individual, physical Ethernet ports. Additionally or alternatively, bridging loops may be controlled by the use of appropriate filtering between ports of the Layer 2 devices.

It was further explained that each of the wireless bridges 8, 9 operate on a different frequency, and that each base station A, B contains a wireless bridge arranged to operate on corresponding frequencies. Such an arrangement helps to ensure that data packets sent between the CCU and the base stations follow the correct wireless path. Furthermore, where switches are used to direct data packets it is advantageous to use managed switches as these allow more control over Layer 2 traffic.

It will be appreciated that the base stations A to F provide wireless communication to the CCUs 2, 2*a*, 2*b*. A variety of different base stations can be used in embodiments of the invention. Any base station not having network address translation capability can be provided with an associated device providing such capability for use in some embodiments of the present invention. From the preceding discussion it can be seen that where NAT devices are used each device providing network address translation capability need have its own unique IP address.

It will further be appreciated that while the above described embodiments have comprised either multiple CCUs or multiple home agents, that in some embodiments of the present invention, both multiple CCUs and multiple home agents may be provided in a single network.

CCUs of different trains have unique IP addresses, and each of the wireless bridges associated with a CCU has a different IP address. However the addresses of the wireless bridges associated with a CCU need not be unique amongst a plurality of CCUs.

In the preceding description it has been explained that the CCUs 2, 2*a*, 2*b* connects to base stations A to F. These base stations can conveniently be provided at the side of a track along which the train travels. In alternative embodiments of the invention the CCUs 2, 2*a*, 2*b* may be configured to communicate with base stations associated with respective mobile telephone networks such that the CCUs 2, 2*a*, 2*b* are configured to connect to different mobile telephone networks as the train moves. Similarly, the CCUs 2, 2*a*, 2*b* can be adapted for connection to satellite networks.

It has been explained in the preceding description that the CCUs 2, 2*a*, 2*b* are arranged to provide wireless network connectivity onboard the train 1 such that passengers travelling on the train 1 can use mobile computing devices to connect to the CCUs 2, 2*a*, 2*b*. It will be appreciated that in some embodiments of the invention the CCUs 2, 2*a*, 2*b* are not adapted to provide wireless network connectivity onboard the train. Such embodiments can be useful in providing, for example, telemetry services and closed circuit television.

The preceding description has been concerned with an embodiment in which the CCUs 2, 2*a*, 2*b* are associated with trains. It will be appreciated that the methods described herein are in no way limited to trains, but are instead widely applicable to any situation in which data communication is provided to a moving person or object. In particular, the methods described can be used to provide data communication to other vehicles (e.g. busses and cars).

The invention claimed is:

1. A method for providing network connections aboard a vehicle, comprising:
   at a first device aboard a first vehicle providing a first virtual network to which at least one second device can connect:
   entering a first operational mode in which data transmitted by said at least one second device over said first virtual network is received by said first device;
   detecting a presence of a third device aboard a second vehicle, said third device being adapted to also provide said first virtual network to which said at least one second device can connect; and entering a second operational mode in which data transmitted to said first virtual network is not received by said first device;

wherein said first device and said third device are each further arranged to provide a second virtual network to which said at least one second device can connect; and wherein in each of said first and second operational modes of said first device is arranged to receive data transmitted by said at least one second device over said second virtual network.

2. A method according to claim 1, wherein the at least one second device comprises a plurality of second devices and the method further comprises:

while said first device is in said second operational mode:
receiving data at said first device on said second virtual network from a first one of said plurality of second devices; and
receiving data at said third device on said first virtual network from a second one of said plurality of second devices.

3. A method according to claim 1, wherein said first vehicle comprises a first plurality of access points and said second vehicle comprises a second plurality of access points, and the method further comprises:

at said first device in said first operational mode:
maintaining a connection with each of said first plurality of access points but not said second plurality of access points and accepting connection by said at least one second device to said first virtual network via at least one of said first plurality of access points; and at said first device in said second operational mode:
maintaining a connection with each of said first and second plurality of access points but not accepting connection by said at least one second device to said first virtual network via any of said first and second plurality of access points.

4. A method according to claim 3, wherein said first device and said third device are each further arranged to provide a second virtual network to which said at least one second device can connect; and wherein in each of said first and second operational modes of said first device is arranged to receive data transmitted by said at least one second device over said second virtual network; and the method further comprising at said first device in said second operational mode:
accepting connection by said at least one second device to said second virtual network via at least one of said first access points and/or at least one of said second access points.

5. A method according to claim 1, wherein said first vehicle is a same as said second vehicle.

6. A method according to claim 5, wherein said first and second vehicles are respective carriages of a train.

7. A method according to claim 6, wherein said first device and said third device are connected via an inter-carriage wired link.

8. A method according to claim 1, wherein said first and second vehicles are different vehicles and wherein said detection occurs during a transient proximity of said first and second vehicles.

9. A method according to claim 1, further comprising:
receiving an indication that said third device meets a predetermined criterion and wherein entering said second operational mode is a response to receiving said indication.

10. A method according to claim 1, wherein said first virtual network is a virtual LAN.

11. A method according to claim 1, further comprising:
while said first device is in said second operational mode:
detecting an absence of said third device and entering said first operational mode.

12. A method according to claim 11, further comprising at said first device:
detecting a presence of a fourth device, said fourth device also adapted to provide said first virtual network to which said at least one second device can connect; and
determining that said fourth device does not meet said predetermined criteria and remaining in said first operational mode.

13. A non-transitory computer readable medium carrying computer readable instructions configured to cause a computer to carry out a method according to claim 1.

14. A computer apparatus for determining suitable communication paths between a first device and a second device, said first device being connected to a plurality of third devices to which said second device is also connected, the apparatus comprising:
a memory storing processor readable instructions; and
a processor arranged to read and execute instructions stored in said memory;
wherein said processor readable instructions comprise instructions arranged to control the computer to carry out a method according to claim 1.

15. An apparatus for providing network connections aboard vehicles, comprising:
a first device aboard a first vehicle, said first device being arranged to:
provide a first virtual network to which at least one second device can connect;
enter a first operational mode in which data transmitted by said at least one second device over said first virtual network is received by said first device;
detect a presence of a third device aboard a second vehicle, said third device being adapted to also provide said first virtual network to which said at least one second device can connect; and
enter a second operational mode in which data transmitted to said first virtual network is not received by said first device;
wherein said first device and said third device are each further arranged to provide a second virtual network to which said at least one second device can connect; and
wherein each of said first and second operational modes of said first device is arranged to receive data transmitted by said at least one second device over said second virtual network.

* * * * *